(12) United States Patent
Atanackovic et al.

(10) Patent No.: US 10,349,648 B2
(45) Date of Patent: Jul. 16, 2019

(54) FUMIGATION SYSTEM AND METHOD

(71) Applicant: Scrubbing Fumigants Pty Ltd, Medindie (AU)

(72) Inventors: Petar Branko Atanackovic, Medindie (AU); Peter Williamson, Medindie (AU)

(73) Assignee: Scrubbing Fumigants Pty Ltd, Medindie (AU)

( * ) Notice: Subject to any disclaimer, the term of this patent is extended or adjusted under 35 U.S.C. 154(b) by 151 days.

(21) Appl. No.: 14/978,298

(22) Filed: Dec. 22, 2015

(65) Prior Publication Data
US 2017/0064939 A1  Mar. 9, 2017

(30) Foreign Application Priority Data

Sep. 7, 2015 (AU) ................................ 2015903645

(51) Int. Cl.
*A01M 13/00* (2006.01)
*B01D 53/10* (2006.01)
*B01D 53/14* (2006.01)
*B01D 53/32* (2006.01)

(52) U.S. Cl.
CPC ......... *A01M 13/00* (2013.01); *B01D 53/1425* (2013.01); *B01D 53/10* (2013.01); *B01D 53/14* (2013.01); *B01D 53/323* (2013.01); *B01D 2252/102* (2013.01); *B01D 2252/204* (2013.01); *B01D 2253/108* (2013.01); *B01D 2257/204* (2013.01); *B01D 2257/30* (2013.01)

(58) Field of Classification Search
CPC .... A01M 13/00; A01M 13/003; A01M 17/00; A01M 17/006; A01M 17/008

USPC ........................ 43/124, 125, 129; 422/30, 31
See application file for complete search history.

(56) References Cited

U.S. PATENT DOCUMENTS

| | | | | |
|---|---|---|---|---|
| 1,613,186 | A * | 1/1927 | Moffett | A23B 9/18 426/319 |
| 2,129,275 | A * | 9/1938 | Hartzell | A01M 13/00 422/28 |
| 4,812,291 | A * | 3/1989 | Friemel | A01M 17/008 422/28 |
| 4,966,755 | A * | 10/1990 | Smith | A01M 13/00 239/136 |
| 5,365,692 | A * | 11/1994 | Gustafson | A01M 13/00 43/124 |

(Continued)

FOREIGN PATENT DOCUMENTS

| | | |
|---|---|---|
| DE | 19506631 A1 | 8/1996 |
| WO | 2014157866 A1 | 10/2014 |

*Primary Examiner* — Darren W Ark
*Assistant Examiner* — Brady W Frazier
(74) *Attorney, Agent, or Firm* — The Webb Law Firm

(57) ABSTRACT

A method and system for fumigating a material is disclosed. The method includes the steps of containing the material to be fumigated in a containment volume and forming a gas mixture in the containment volume, the gas mixture including at least a fumigation agent and an ambient gas originally present within the containment volume, wherein the partial pressure of the fumigation agent is elevated with respect to the ambient gas in the containment volume. The method further includes then maintaining a concentration of a fumigation agent within the containment volume for a required time to fumigate the material and then removing the fumigation agent from the containment volume.

11 Claims, 26 Drawing Sheets

(56) References Cited

U.S. PATENT DOCUMENTS

| | | | | |
|---|---|---|---|---|
| 5,662,865 | A * | 9/1997 | Blatchford | A61L 9/00 422/29 |
| 5,876,665 | A * | 3/1999 | Zalis | A01M 1/245 422/123 |
| 6,514,550 | B1 * | 2/2003 | Frati | A23B 4/16 426/320 |
| 6,688,036 | B1 * | 2/2004 | Gunn | A01M 13/00 43/125 |
| 6,766,612 | B1 * | 7/2004 | Liu | A01M 13/003 43/125 |
| 7,765,733 | B1 * | 8/2010 | Liu | A01M 5/00 43/132.1 |
| 7,908,791 | B1 * | 3/2011 | Brash | A01M 13/003 43/125 |
| 2006/0269438 | A1 * | 11/2006 | Lagunas-Solar | A01M 1/226 422/1 |
| 2008/0251514 | A1 | 10/2008 | Fitzpatrick et al. | |
| 2009/0272024 | A1 * | 11/2009 | Rogacki | A01M 13/003 43/125 |
| 2012/0051968 | A1 * | 3/2012 | Ivanne | A01M 13/00 422/28 |
| 2012/0186138 | A1 * | 7/2012 | Bell | A01M 13/003 43/125 |
| 2016/0051714 | A1 | 2/2016 | Kim et al. | |

\* cited by examiner

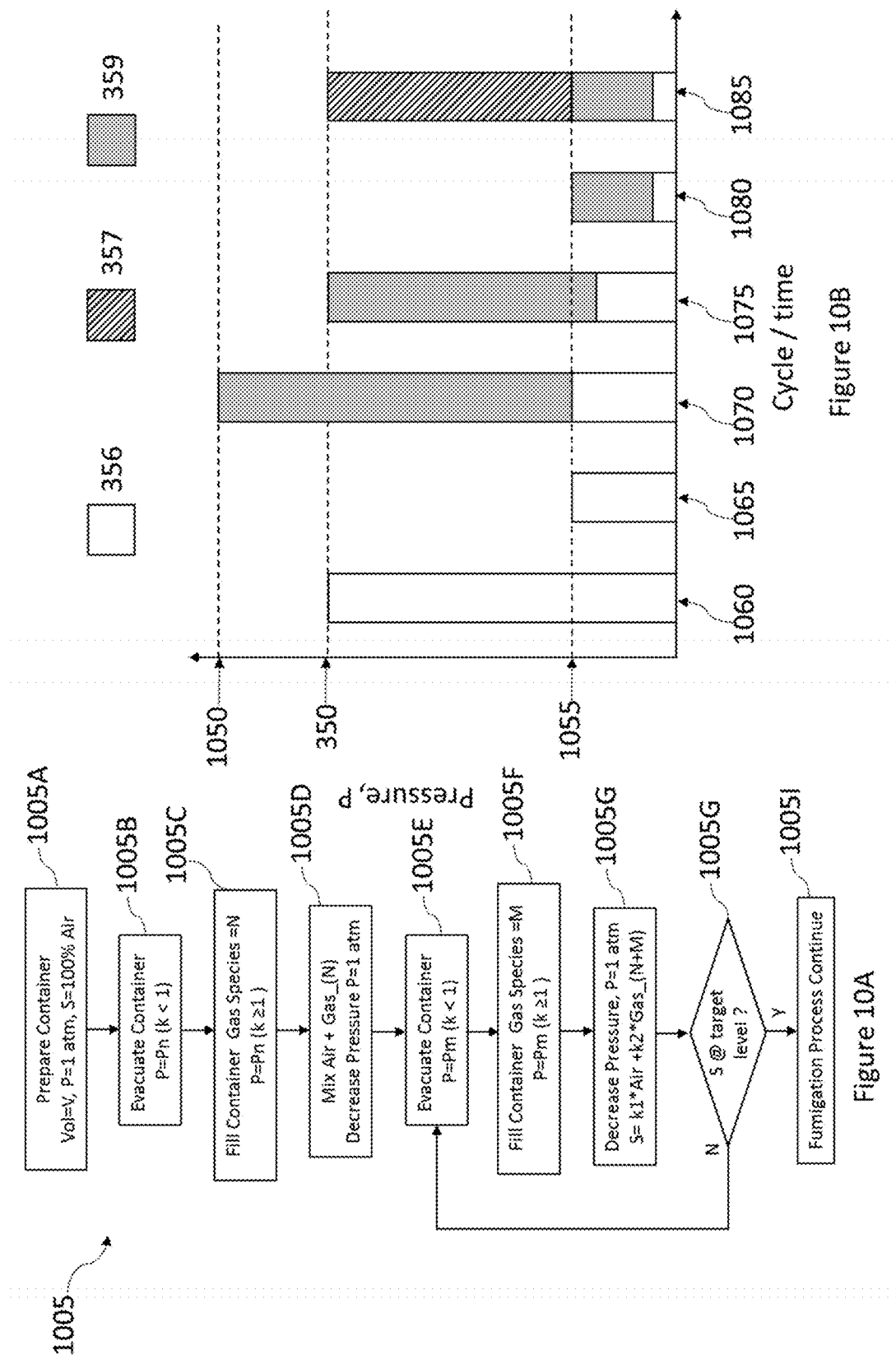

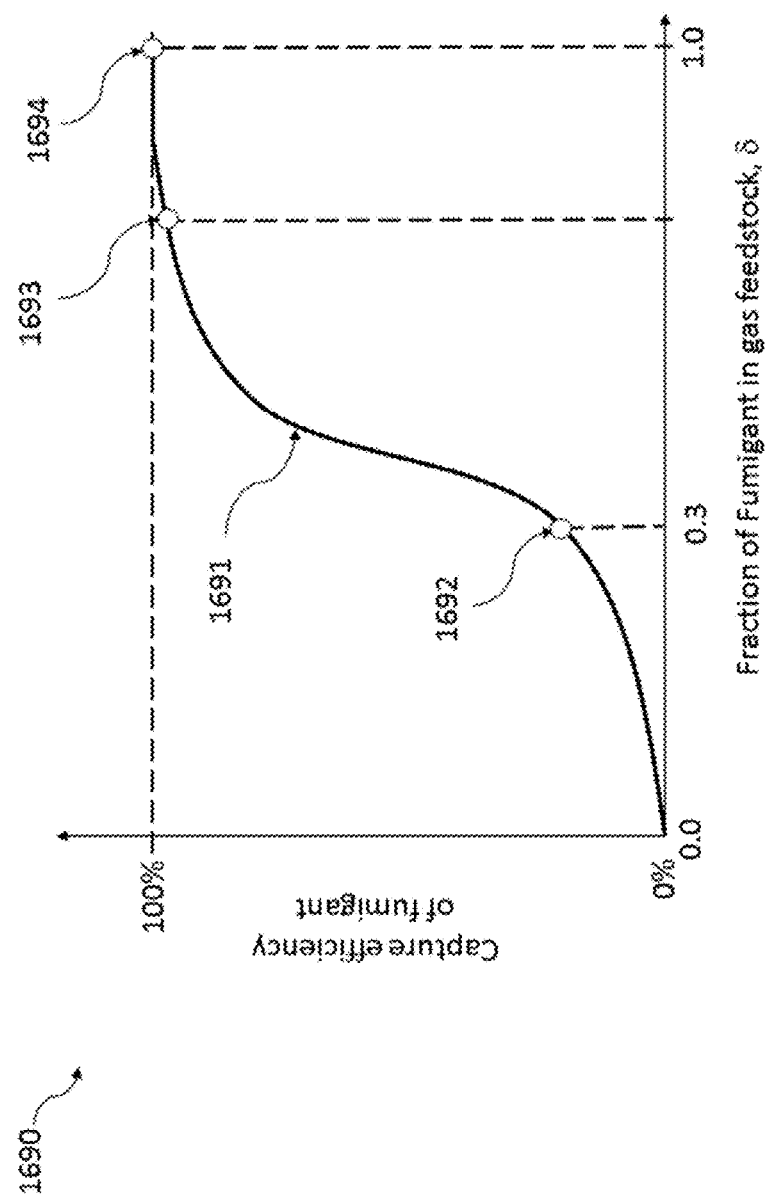

FUMIGATION SYSTEM AND METHOD

CROSS REFERENCE TO RELATED APPLICATION

This application claims priority to Australian Provisional Patent Application No. 2015903645 filed Sep. 7, 2015, the disclosure of which is hereby incorporated in its entirety by reference.

FIELD OF THE INVENTION

The present disclosure relates to the fumigation of materials. In a particular form, the present disclosure relates to the fumigation of materials for storage or transportation.

BACKGROUND TO THE INVENTION

Fumigation is a process for the management of pests, insects, nematodes and contaminants employing fumigation agents or fumigants typically in gaseous form. As an example, the transportation of goods and materials worldwide now typically requires highly regulated fumigation processes prior to the movement of goods between locations. The fumigants certified for present and future use are of highly toxic nature by design and accordingly require strict environmental control. In addition, certain classes of fumigants are greenhouse gas active. Despite this, available fumigation processes vent the active fumigant into the atmosphere and/or immediate surroundings following fumigation and rely on gas-like dispersion to achieve once again safe levels for human interaction. This severely limits the operating areas for fumigation necessitating well ventilated areas. Some fumigants retain substantial toxic activity in the environment for extended periods and can readily accumulate to unsafe levels arising from repeated use in the same location.

Some of the commercially available fumigants include methyl-bromide (MB), sulfuryl-fluoride (SF), aluminum phosphide or phosphine gas (PG), chloropicrin, methyl isocyanate, hydrogen cyanide, formaldehyde and iodoform. Other fumigants, such as organosulfur compounds (dithiocarbamate) and new proprietary fumigants are also possible; however, global policies have been formulated based on environmental concerns to restrict the number of certified fumigants available for use. As a consequence, there are substantial up-front costs in obtaining registration or certification of new fumigation agents because of these regulatory requirements.

Of the fumigants commercially used, sulfuryl-fluoride (SF) has been found to be highly effective. Unfortunately, halide-based fumigants, apart from being highly toxic, are also well known greenhouse gases (GHGs) which are also highly reactive as ozone depleting agents. Studies have shown that the worldwide measured atmospheric concentration of halide-based fumigants is rising rapidly and is well correlated to the fumigation industry use of these substances. As a result, these halide-based gases have now irreversibly accumulated in the upper atmosphere. As such, continued use of these GHG fumigants is likely to face even stricter governmental regulation worldwide to restrict their use.

These issues with fumigants and their use are in stark contrast to their essential involvement in the preparation, storage and movement of materials in the modern economy especially in the area of food production. There is therefore a need to improve the efficacy of fumigation methods and reduce the environmental impact of these processes.

SUMMARY OF THE INVENTION

In a first aspect, the present disclosure accordingly provides a method for fumigating a material including:
 containing the material to be fumigated in a containment volume;
 forming a gas mixture in the containment volume, the gas mixture comprising at least a fumigation agent and an ambient gas originally present within the containment volume, wherein the partial pressure of the fumigation agent is elevated with respect to the ambient gas in the containment volume;
 maintaining a concentration of a fumigation agent within the containment volume for a required time to fumigate the material; and
 removing the fumigation agent from the containment volume.

In another form, forming a gas mixture in the containment volume includes initially evacuating a portion of the ambient gas from the containment volume to reduce the partial pressure of the ambient gas and then introducing the fumigation agent into the containment volume.

In another form, the fumigation agent includes a fumigant gas and a buffer gas, and wherein forming a gas mixture in the containment volume includes introducing the buffer gas into the containment volume following initially evacuating a portion of the ambient gas from the containment volume.

In another form, the buffer gas is introduced into the containment volume after the fumigant gas.

In another form, the buffer gas is introduced into the containment volume prior to the fumigant gas.

In another form, the gas mixture in the containment volume is allowed to reduce to atmospheric pressure prior to the introduction of the fumigant gas into the containment volume.

In another form, the gas mixture in the containment volume is allowed to reduce to atmospheric pressure following the introduction of the fumigant gas into the containment volume.

In another form, a portion of the gas mixture in the containment volume following the introduction of the buffer gas is evacuated from the containment volume.

In another form, the buffer gas is selected to increase the metabolic rate of a pest being fumigated.

In another form, forming a gas mixture in the containment volume includes:
 introducing the fumigation agent into the containment volume;
 reducing the pressure of the gas mixture; and
 introducing further fumigation agent into the containment volume.

In another form, reducing the pressure of the gas mixture includes allowing the pressure of the gas mixture to equalize with atmospheric pressure over time to reduce the pressure of the gas mixture to atmospheric pressure.

In another form, the method further includes:
 further reducing the pressure of the gas mixture; and
 introducing further fumigation agent into the containment volume.

In another form, further reducing the pressure of the gas mixture includes allowing the pressure of the gas mixture to equalize with atmospheric pressure over time to reduce the pressure of the gas mixture to atmospheric pressure.

In another form, the method further includes introducing a buffer gas into the containment volume.

In another form, the buffer gas is selected to increase the metabolic rate of a pest being fumigated.

In a second aspect, the present disclosure accordingly provides a method for capturing residual fumigation agent from a fumigation process involving the fumigation of a material in a containment volume, including:

receiving an output fumigation gas mixture from a containment volume following the fumigation process, the fumigation gas mixture including the residual fumigant; and capturing the residual fumigant from the output fumigation gas mixture.

In another form, capturing the residual fumigant from the output fumigation gas mixture includes absorbing the residual fumigant from the output fumigation gas mixture.

In another form, separating the residual fumigation agent includes feeding the output fumigation gas mixture through a liquid solvent to absorb the residual fumigation agent to form a loaded liquid solvent.

In another form, the method further includes separating the residual fumigation agent from the loaded liquid solvent.

In another form, the liquid solvent following separation of the residual fumigation agent is recycled to absorb further residual fumigation agent in the output fumigation gas mixture.

In another form, separating the residual fumigation agent from the output fumigation gas mixture includes adsorbing the residual fumigation agent from the output fumigation gas mixture.

In another form, the residual fumigation agent is adsorbed by a solid sorbent.

In another form, the residual fumigation agent is adsorbed by a solid sorbent in a fluidized bed reactor.

In another form, the residual fumigation agent is at an elevated partial pressure compared to an ambient gas in the containment volume.

In a third aspect, the present disclosure accordingly provides a method for abating the environmental impact of residual fumigation agent from a fumigation process involving the fumigation of a material in a containment volume, including:

receiving an output fumigation gas mixture from a containment volume following the fumigation process, the fumigation gas mixture including the residual fumigant; and processing the residual fumigation agent from the output fumigation gas mixture to reduce its environmental impact.

In another form, the residual fumigation agent includes decomposing the residual fumigation agent.

In another form, decomposing the residual fumigation agent includes decomposing by a high temperature plasma module.

In another form, processing the residual fumigation agent includes chemically converting the residual fumigation agent to form a stable compound having a reduced environmental impact.

In a fourth aspect, the present disclosure accordingly provides a system for fumigation of a containment volume, the system including:

a fumigation module including a containment volume containing a material to be fumigated by a fumigation agent introduced into the containment volume and then removed from the containment volume following the fumigation process;

an abatement module receiving as an input the remnant fumigation agent following the fumigation process, the fumigation agent operable to process the remnant fumigation agent to abate its environmental impact.

In another form, the abatement module is operable to decompose the remnant fumigation agent.

In another form, the remnant fumigation agent is decomposed by a high temperature plasma module.

In another form, the remnant fumigation agent is chemically converted to form a stable compound having a reduced environmental impact.

In another form, the abatement module includes a fumigant capture module, the fumigant capture module operable to capture the remnant fumigation agent in an active capture medium for further processing.

In another form, the active capture medium is a sorbent material and the remnant fumigation agent is absorbed or adsorbed by the sorbent material.

In another form, the sorbent material is a liquid solvent deployed in an absorber module, wherein the remnant fumigation agent is absorbed by the liquid solvent in the absorber module to form a loaded liquid solvent.

In another form, the absorber module is configured as an absorption column with the liquid solvent arranged to flow in a countercurrent direction to the flow of the remnant fumigation agent.

In another form, the absorption column includes a plurality of packing elements to increase the surface area of the absorption column.

In another form, the sorbent material is a solid material deployed in an adsorber module and the remnant fumigation agent is adsorbed by the solid material.

In another form, solid material is selected from any one of:

powders;

porous solids; or zeolites.

In another form, the adsorber module is a fluidized bed reactor.

In another form, the abatement module further includes a separation module to separate the fumigation agent captured from the active capture medium for further processing.

In another form, the recovered active capture medium is recycled.

In another form, a partial pressure of the fumigation agent is elevated with respect to an ambient gas originally present within the containment volume.

In a fifth aspect, the present disclosure accordingly provides a mobile fumigation plant for fumigating a container, including:

a fumigation agent source;

a pumping arrangement controllable to pump fumigation agent into the container and to vent remnant fumigation agent from the container following fumigation;

an abatement arrangement operable to receive the remnant fumigation agent from the container and reduce an environmental impact of the remnant fumigation agent.

In another form, the abatement arrangement is operable to decompose the remnant fumigation agent.

In another form, the abatement arrangement is operable to chemically convert the remnant fumigation agent.

In another form, the abatement arrangement is operable to capture the remnant fumigation agent for further processing.

In another form, the fumigation plant is deployed on a trailer for transportation by a prime mover.

BRIEF DESCRIPTION OF THE DRAWINGS

Embodiments of the present disclosure will be discussed with reference to the accompanying drawings wherein:

FIG. 10A is a flow chart of an evacuation method for increasing the partial pressure of a fumigation agent employing the fumigation system illustrated in FIG. 7 according to another illustrative embodiment;

FIG. 10B is a graph depicting the increased fumigation agent partial pressure obtained following the method illustrated in FIG. 10A;

FIG. 16C is a graph of residual fumigant capture as a function of the fumigant fraction in the process stream;

In the following description, like reference characters designate like or corresponding parts throughout the figures.

DETAILED DESCRIPTION OF THE INVENTION

Figure 1:
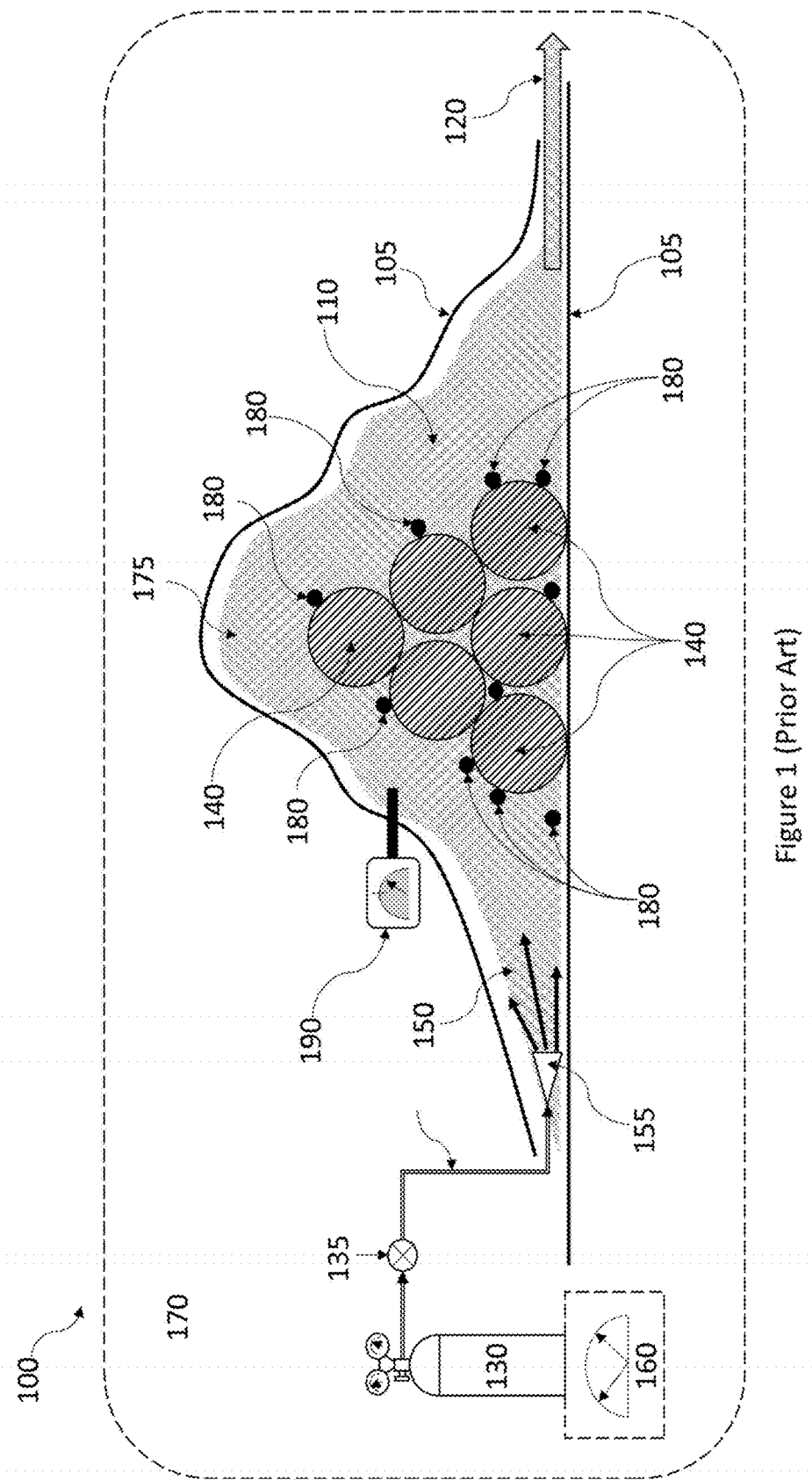
FIG. 1 is a schematic of a general fumigation method.

Referring now to FIG. 1, there is shown a schematic of a general process for fumigation 100 as is known in the prior art. In this example, a container or region is isolated with a flexible membrane or sheet 105 to form a containment volume 110 containing the material 140 to be fumigated. Also shown figuratively are the pests or contaminants 180 to be fumigated on the product material 140. Some example, material and pest combinations include where material 140 is selected from timber, wood, grain, legumes, hay, organic feed stocks, vegetation, paper, cardboard, woven fibers, wood chips, structural organic products and pest 180 may be in the form of woodborers, dry wood termites, termites, ants, beetles, weevils, insects, arachnids, rodents, vermin, fleas, larvae, eggs and the like. In one example, if material 140 is wood logs and timber, then target pest 180 for fumigation could include insects, beetles and termites in all stages of their lifecycle including adult, larva, pupa and the like.

Fumigation agent 150 is then introduced into containment volume 110 enclosed by membrane 105 and mixes with the ambient air mixture already present in containment volume 110 to form a gas mixture 175 consisting of the fumigation agent and the ambient air mixture. Fumigation agent 150 in this example is a concentrated fumigant gas provided by a source 130 and controlled by a delivery valve 135 and introduced into the containment volume 110 by gas injector 155.

An optional pressure sensor 190 may be adopted to measure the pressure of the combined fumigation agent ambient air gas mixture 175 contained within containment volume 110. In other systems, the sensor may be a fumigant specific concentration sensor that measures the concentration of the specific fumigation agent 150 within containment volume 110. The combined fumigation agent ambient air gas mixture 175 has a leakage path 120 having a leak rate to the environment 170. As would be appreciated, while leakage path 120 is depicted figuratively in FIG. 1 as a single path, the leakage path 120 is in fact the combination of potential sources of leakage in the containment volume 110 including the material employed to define the containment volume 110, any apertures or openings in containment volume 110, and the effectiveness of any seals between different sections of the containment volume 110.

A predetermined mass or dose of fumigation agent 150 is introduced into containment volume 110 containing the material 140 and the infesting pests 180. Fumigation of material 140 relies on diffusion of the fumigation agent 150 throughout the containment volume 110 and subsequent adsorption onto surfaces of the material 140 that is to be fumigated (see also FIG. 11).

Depending upon the leak rate 120 to the environment 175, additional mass of fumigation agent 150 maybe introduced into containment volume 235 to ensure sufficient dose of fumigant to carry out the fumigation process.

The minimum amount of fumigation agent 150 that is to be delivered to the material and surrounding volume contained within containment volume 110 defined by the membrane 105 is calculated based on the volume of ambient air contained within the containment volume and the estimated surface area of the material 140 to be fumigated. Additional fumigation agent is provided to account for material loss through leakage path 120 as a function of time as well as the take up of the fumigation agent by the material 140 and pests 180.

Specific doses of fumigation agent must be used to provide high probability of success for the fumigation process. For example, a system employing SF gas as a fumigation agent 150, a concentration of 16 mg per liter (equal to 3833 ppm in air at 25° C.) is initially provided in a containment volume (for example 1000 m$^3$) containing material 140 in the form of wood products.

For a total process soak time of 24 hours the minimum concentration of SF in the volume at the end of the soak period must be sufficient to provide a minimum dose. At the end of the fumigation process soak time, the remaining gas mixture 175 consisting of the residual fumigation agent and the ambient air is vented to the atmosphere 175 for a time determined to adequately allow diffusion of the relevant toxin to a safe working level for humans. If this delay time is too short, significant accumulation of fumigation agent within the environment can result. As a consequence, this dissipation or diffusion time determines a major limiting step to the overall process time requirement as it is non-effective dead time where fumigation of subsequent material cannot be carried out.

Figure 2:
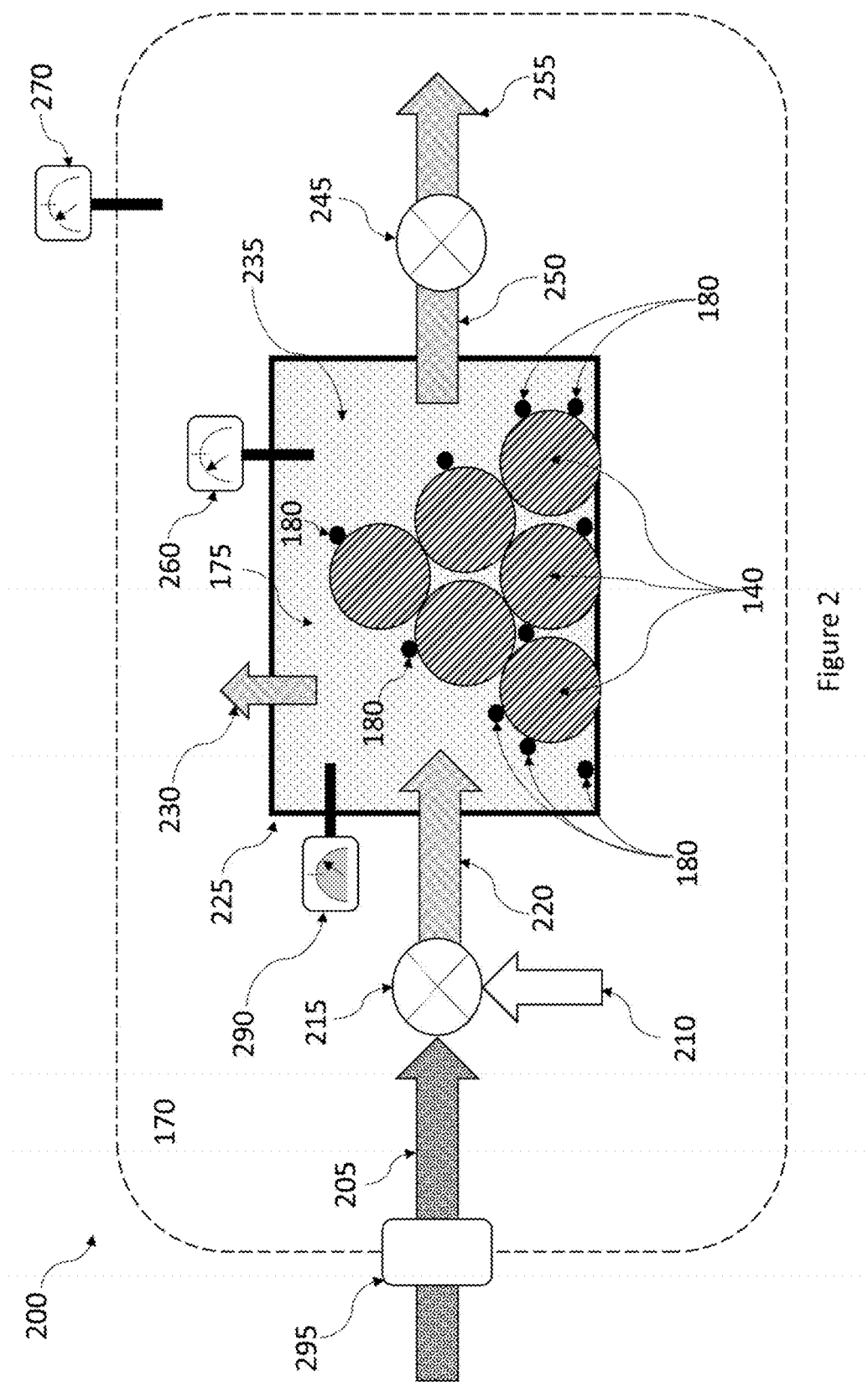
FIG. 2 is a schematic of a fumigation system according to an illustrative embodiment.
Figure 23:
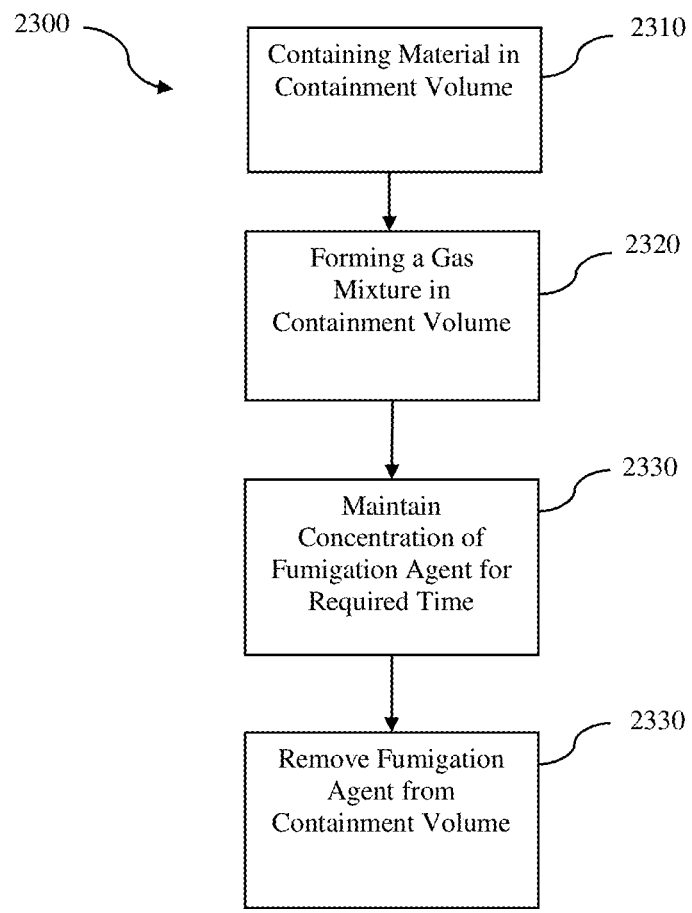
FIG. 23 is a flowchart of a method for fumigating a material or substance according to a further illustrative embodiment.

Referring now to FIG. 2, there is shown a schematic of a fumigation system 200 for fumigating a material 140 in accordance with an illustrative embodiment. Referring also to FIG. 23, there is shown a method for fumigating a material 140 also in accordance with an illustrative embodiment.

At step 2310, the material 140 to be fumigated is contained with containment volume 235 which in this example is a chamber having chamber walls 225. As would be appreciated, the containment volume 235 may be formed by any suitable form of enclosure that functions to contain the fumigation agent within the containment volume. It is understood that the enclosure may not be necessarily air tight as examples of suitable enclosures include forming a containment volume by draping or arranging a flexible material over the material to be fumigated. In other examples, the containment volume may be a storage container such as a grain silo, bunker, hopper or bin. In yet other examples, the containment volume may be a transportation container such as a shipping container or the hold or hold portion of a transport vehicle such as a ship, aircraft, spacecraft or submarine or similar. In a further example, the containment volume may be a structure such as pipeline, tunnel, room, building, chamber, vessel, drain or catchment region.

At step 2320, a gas mixture in containment volume 235 is formed where the gas mixture comprises at least a fumigation agent 220 and the ambient air mixture. As will be described below, the partial pressure of the fumigation agent is elevated with respect to the ambient air mixture in the containment volume 235.

In this example, fumigation agent 220 is introduced into containment volume 235 or chamber 225 at an initial pressure by a control input valve 215 where it then diffuses to form a gas mixture 175 consisting of the fumigation agent 220 and the ambient air mixture. Fumigation agent 220 in this embodiment is comprised of a pure fumigant gas 205 for example in the form of compressed gas cylinder, which is regulated by a calibrated gas flow controller 295 and may optionally include an air input channel 210 which can then be mixed with the fumigant gas 205 to achieve a desired concentration by gas mixing controller 215 before introduction into containment volume 235 via input valve 215. In this embodiment, the pressure and composition of the combined fumigation agent ambient gas mixture is measured by sensors 260 and 290.

At step 2330, the concentration of the fumigation agent in the containment volume 235 is maintained for the required time necessary to fumigate the material 140.

At step 2340, the fumigation agent 220 is then removed from containment volume 235. In this embodiment, fumigation system 200 includes an isolation or output valve 245 connected to the containment volume 235 to control the out flow 250 of the combined fumigation agent ambient air gas mixture 175 out of containment volume 235. The immediate environment 170 outside of containment volume is monitored by pressure and gas composition sensor 270 to determine optimal process chamber configuration. In general, a low leak rate 230 is sought as this will improve coating efficiency of the fumigation agent 220 onto the material 140 and the leak rate may be monitored by direct measurement using sensors 290, 260 and 270.

In other embodiments, fumigation agent 220 may be removed by backfilling the containment volume 235 with a plurality of process gases, either sequentially or in combination. For example, input air channel 210 may be employed for backfilling by introducing a process gas selected from, but not limited to, air having specified moisture content, an inert gas such as nitrogen or oxygen, or an oxygen-rich gas.

The Applicant has recognized that the diffusion of fumigation agent 220 within the containment volume 235 will be limited by the pressure differential between fumigation agent and that of the ambient gas originally within the containment volume which will generally be at atmospheric pressure effectively diluting the fumigation agent 220 within the gas mixture. Typically, the ambient gas originally present in the containment volume 235 will be an ambient air mixture, however, the ambient gas or original gas environment in the containment volume 235 may comprise air of a specified moisture content, an inert gas or other gas, or indeed combination or mixture of gases. Accordingly, a fumigation process involving an elevated partial pressure of the fumigation agent 220 with respect to the ambient gas will be highly advantageous for increasing the efficiency of the process and decreasing the total fumigant required to be input into the system. This may be further improved by reducing the leakage rate from the containment volume to the environment to maintain this pressure differential over time.

As referred to at step 2320, fumigation agent 220 is introduced into containment volume 235 at an elevated partial pressure with respect to the partial pressure of the ambient air in containment volume 235. In one example, the partial pressure of fumigation agent 220 within containment volume 235 is increased by a pump-purge method.

Figure 3:
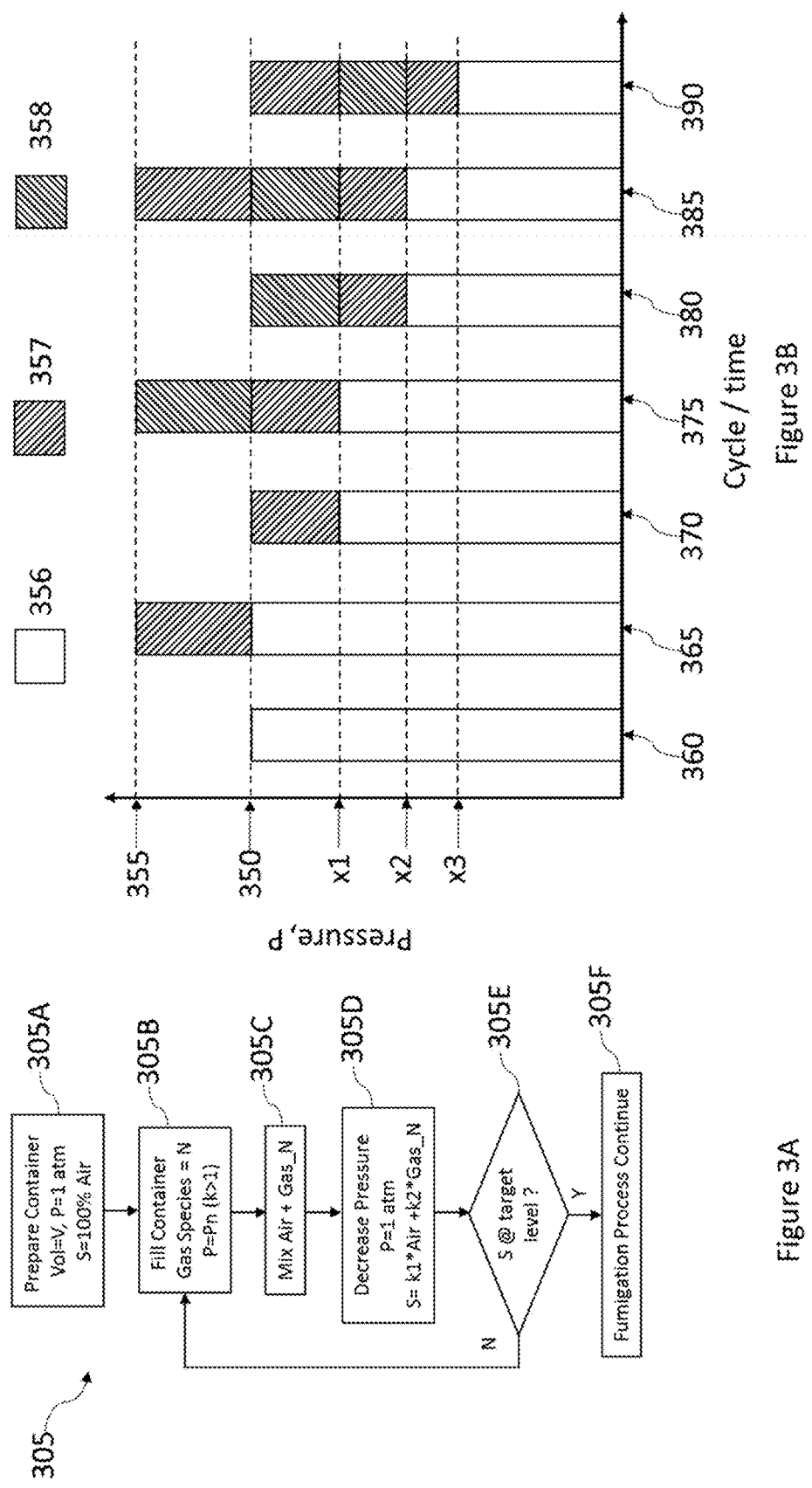
FIG. 3A is a flow chart of a pump-purge method for increasing the partial pressure of a fumigation agent according to an illustrative embodiment.
FIG. 3B is a graph depicting the increased fumigation agent partial pressure obtained following the method illustrated in FIG. 3A.

Referring now to FIG. 3A, there is shown a flow chart 305 of a pump-purge method for increasing the partial pressure of a fumigation agent with respect to the ambient air in accordance with an illustrative embodiment. Referring also to FIG. 3B, there is shown a graph of the process cycle states depicting the increased fumigation agent partial pressure in the containment volume obtained following the method illustrated in FIG. 3A.

As depicted in FIG. 3B, the unshaded regions 356 represents ambient air mixture, ie air, and the shaded regions 357 and 358 represent successive introductions of the fumigation agent 220 into containment volume 235. As would be clear, at least one of the process gases 357 and 358 is a fumigant gas wherein the fumigation agent may comprise one or more different fumigant species or types.

At step 305A, the containment volume 235 is filled with an ambient gas comprising in this embodiment air at atmospheric pressure 350. This can be seen as process cycle state 360 in FIG. 3B. As would be appreciated, this would be the assumed initial state of any containment volume that is open to the environment.

Next, at steps 305B and 305C (FIG. 3A) and process cycle state 365 (FIG. 3B), the fumigation agent 357 is introduced into the containment volume 225 with higher pressure 355 than the initial pressure of the ambient air in containment volume 235 and allowed to mix with the ambient air to form a gas mixture comprising the fumigation agent and the ambient air.

At step 305D (FIG. 3A) and process cycle state 370 (FIG. 3B), the gas mixture in containment volume 235 can then be equilibrated to the environment where it will substantially equalize with atmospheric pressure 350 as indicated. The fumigant partial pressure ratio relative to air is then given by the value x1. In another embodiment, the pressure of the gas mixture in the containment volume may be reduced by a pumping arrangement.

As step 305E (FIG. 3A), the partial pressure S of the fumigation agent is then measured to determine if it is at a target partial pressure that is elevated or increased compared to the partial pressure of the ambient air mixture. As an example, where the target partial pressure of the fumigation agent is sought to be greater than the partial pressure of the ambient gas mixture further process cycle states such as, 375 & 380 and 385 & 390 (FIG. 3B) may be performed by additional filling of fumigation agent 358, 357 and equalization to achieve fumigant partial pressures of x2 and then x3, respectively. As would be appreciated, the pressure differential between states 355 and 350 determines the partial pressure that can be achieved per cycle.

Once the target partial pressure for the fumigation agent has been attained, the fumigation process may be continued at step 305F.

Referring again to the fumigation system 200 depicted in FIG. 2, the method steps and process cycle states illustrated in FIGS. 3A and 3B may be achieved by controlling automated input valve 215 and output valve 245 and monitoring sensors 290 and 260. As would be appreciated, where the process involves allowing the pressure of the containment volume 235 to equalize to atmospheric pressure following introduction of the fumigation agent 220 there is no further requirement for a pumping arrangement to reduce the pressure of the gas mixture within containment volume 235.

Once a predetermined elevated fumigation agent partial pressure is achieved within the containment volume 235, the process soak occurs for a predetermined amount of time. After the soak step the chamber is vented and may be backfilled with air.

Figure 4:
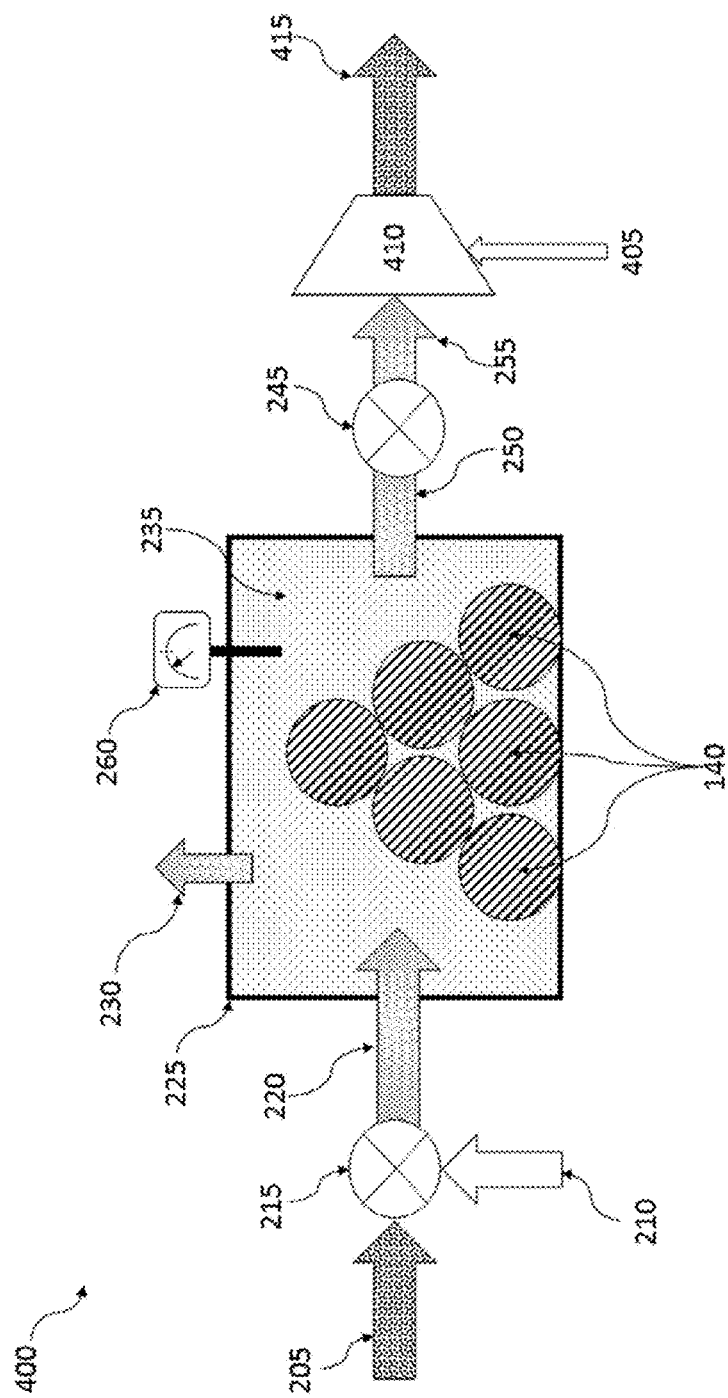
FIG. 4 is a schematic of a fumigation system according to another illustrative embodiment.

Referring now to FIG. 4, there is shown a schematic of a fumigation system 400 in accordance with another illustrative embodiment. Fumigation system 400 is similar to fumigation system 200 illustrated in FIG. 2 but incorporates an additional pumping system 410 connected to the output isolation valve 245.

Control signals are used to control pumping system 410 which is powered by input energy 405. The output fumigation mixture 415 may then be vented directly to the atmosphere of be subsequently processed in capture and abatement modules.

Figure 6B:
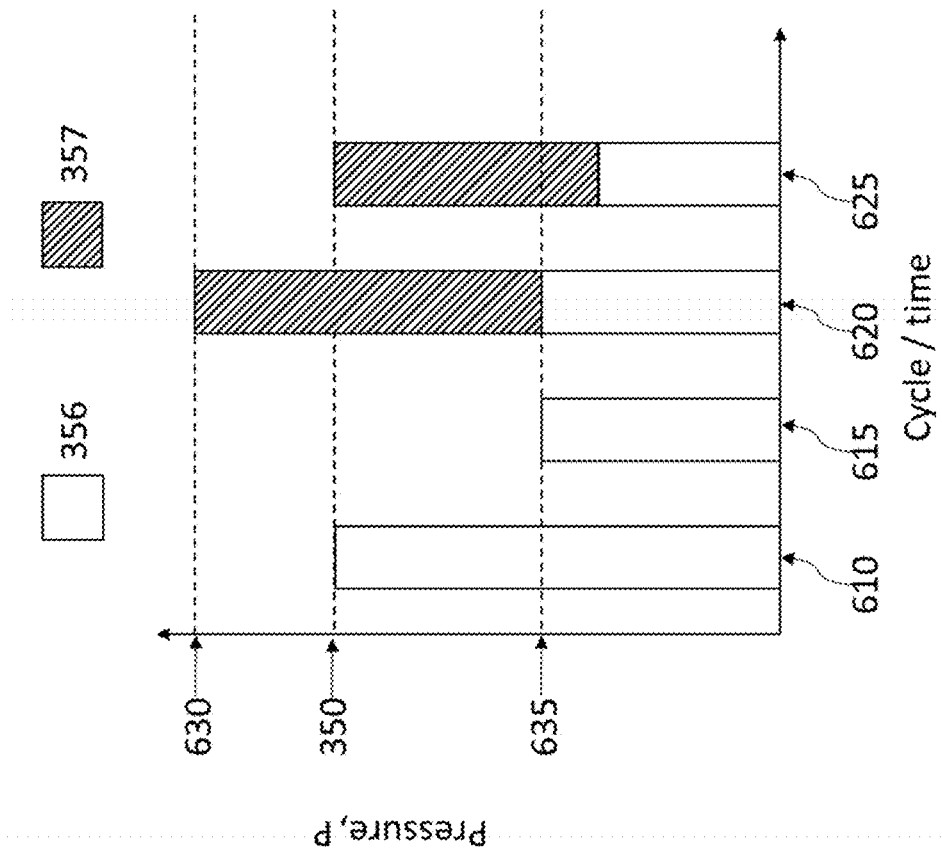
FIG. 6B is a graph depicting the increased fumigation agent partial pressure obtained following the method illustrated in FIG. 6A.
Figure 6A:
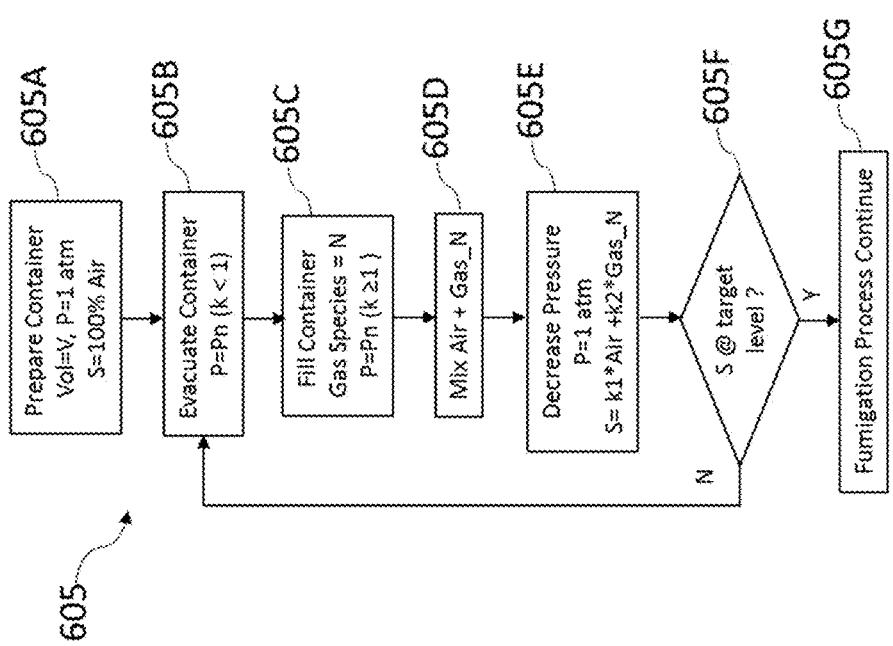
FIG. 6A is a flow chart of an evacuation method for increasing the partial pressure of a fumigation agent according to an illustrative embodiment.

Referring now to FIG. 6A, there is shown a flow chart 605 of an evacuation method for increasing the partial pressure of a fumigation agent within a containment volume according to an illustrative embodiment; Referring now to FIG. 6B, there is shown a graph of the process cycle states depicting the increased fumigation agent partial pressure obtained following the method illustrated in FIG. 6A. The unshaded regions 356 represent ambient air mixture and the shaded regions 357 represent the fumigation agent.

With reference to fumigation system 400, at step 605A the containment volume 235 is filled with an ambient gas comprising air at atmospheric pressure 350. This can be seen as process cycle state 610 in FIG. 6B. In one example, process cycle state 610 is achieved by configuring input valve 215 to pass only air 210 and output isolation valve 245 is also left open to atmosphere.

At step 605B, the containment volume 235 is initially evacuated by reducing the pressure of the ambient gas to a value 635 from the initial atmospheric pressure achieving a predetermined pressure level 635 corresponding to process cycle state 615 as shown in FIG. 6B. For fumigation system 400, this may be achieved by closing input gas valve 215 to isolate containment volume 235 and then opening the gate valve 245 to the pumping system 410 which functions to evacuate containment volume 235. Once pressure level 635 is attained the isolation gate valve 245 is then closed.

At steps 605C and 605D, the containment volume 235 is filled with the fumigation agent until a pressure value 630 is achieved which is higher than atmospheric pressure which can be seen as process cycle state 620 in FIG. 6B. In this state, the fumigation agent and remaining ambient air will mix and disperse throughout the containment volume 235.

At step 605E (FIG. 6A) and process cycle state 625 (FIG. 6B), the gas mixture in containment volume 235 may then be allowed to attain a state of equilibrium with the environment to reduce the combined pressure in containment volume 235 to atmospheric pressure 350. In one example, where there is a leakage from containment volume 235 then this process will occur gradually over time. In another example, one or more of input gas valve 215 and/or gate valve 245 and pumping system 410 may be opened to the environment. In yet another example, where containment volume 235 is substantially sealed and there is no leakage, the fumigation process will occur at higher than atmospheric pressure but still with an elevated partial pressure for the fumigation agent. In yet another example, the pumping system 410 may be employed to pump down containment volume to atmospheric pressure.

As can be seen from FIG. 6B, containment volume 235 has now achieved a fumigation agent gas partial pressure δ that is a majority of fumigation gas by proportion. At step 606F, if the partial pressure of the fumigation agent is not at the required level, then containment volume 235 may be evacuated again 605B and the process is then repeated. When the fumigation agent is at the target partial pressure, the fumigation process may then continue at 605G.

Figure 7:
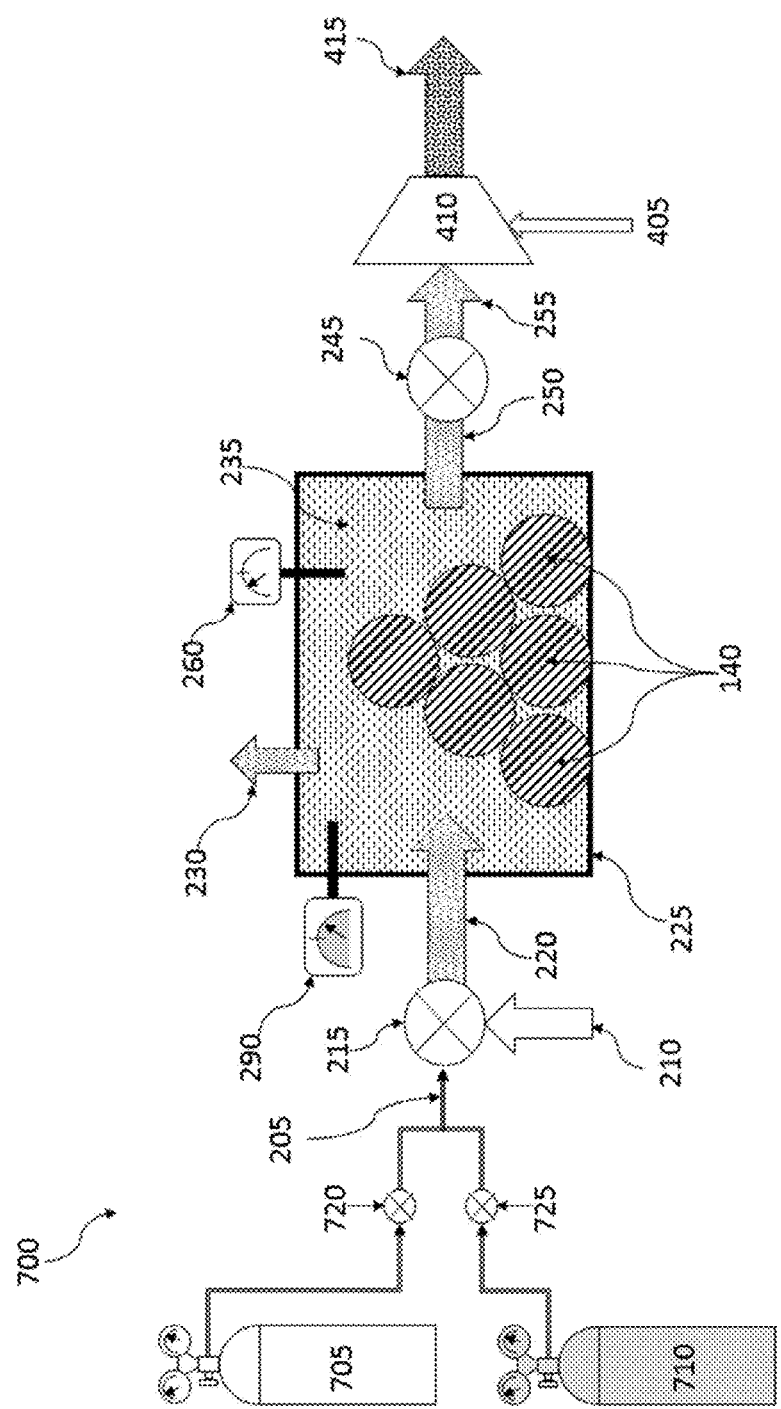
FIG. 7 is a schematic of a fumigation system according to yet another illustrative embodiment.

Referring now to FIG. 7, there is shown a schematic of a fumigation system 700 according to yet another illustrative embodiment. Fumigation system 700 is similar to fumigation system 400 illustrated in FIG. 4 and includes a modified fumigation agent input stage where the fumigation agent 220 includes a fumigant gas 705 and a buffer gas 710 which are mixed or switched using control valves 720 and 725 and then subsequently fed into input control valve 215.

Referring now to FIGS. 8A and 8B, 9A and 9B, and 10A and 10B, there are shown various flow charts and associated graphs of process cycle states which may be used in combination with fumigation system 700 where a buffer gas 710 is combined with a fumigant gas 705 to increase the partial pressure of the fumigation agent 220 relative to the partial pressure of the initial ambient air mixture. In these diagrams, unshaded region 356 represents the air mixture, shaded region 359 represents the buffer gas and diagonal striped region 359 represents the fumigant gas.

In one example, the buffer gas is oxygen or an oxygen rich gas and will function generally to increase the metabolic rate of pests 180 to increase the uptake and effectiveness of the fumigant gas 705 and as a result increase its efficiency. In this way, the concentration of oxygen in the buffer gas and hence in the final buffer gas 710, fumigant gas 705 and air mixture may be directly tailored depending on the targeted pest to enhance the fumigation uptake in the target.

In another example, buffer gas 710 may be employed to increase the ambient temperature by preheating to again increase the metabolic rate of the targeted pests and the reactivity of the fumigant gas 705. This may be applied to a buffer gas 710 which is inert or oxygen rich as the case may be. In one example, the temperature of the buffer gas 710 is selected to achieve an overall fumigation temperature above 10° C. In another example, the temperature of the buffer gas 710 is selected to achieve an overall fumigation temperature above 20° C. In yet another example, the temperature of the buffer gas 710 is selected to achieve an overall fumigation temperature above 30° C.

Figure 8B:
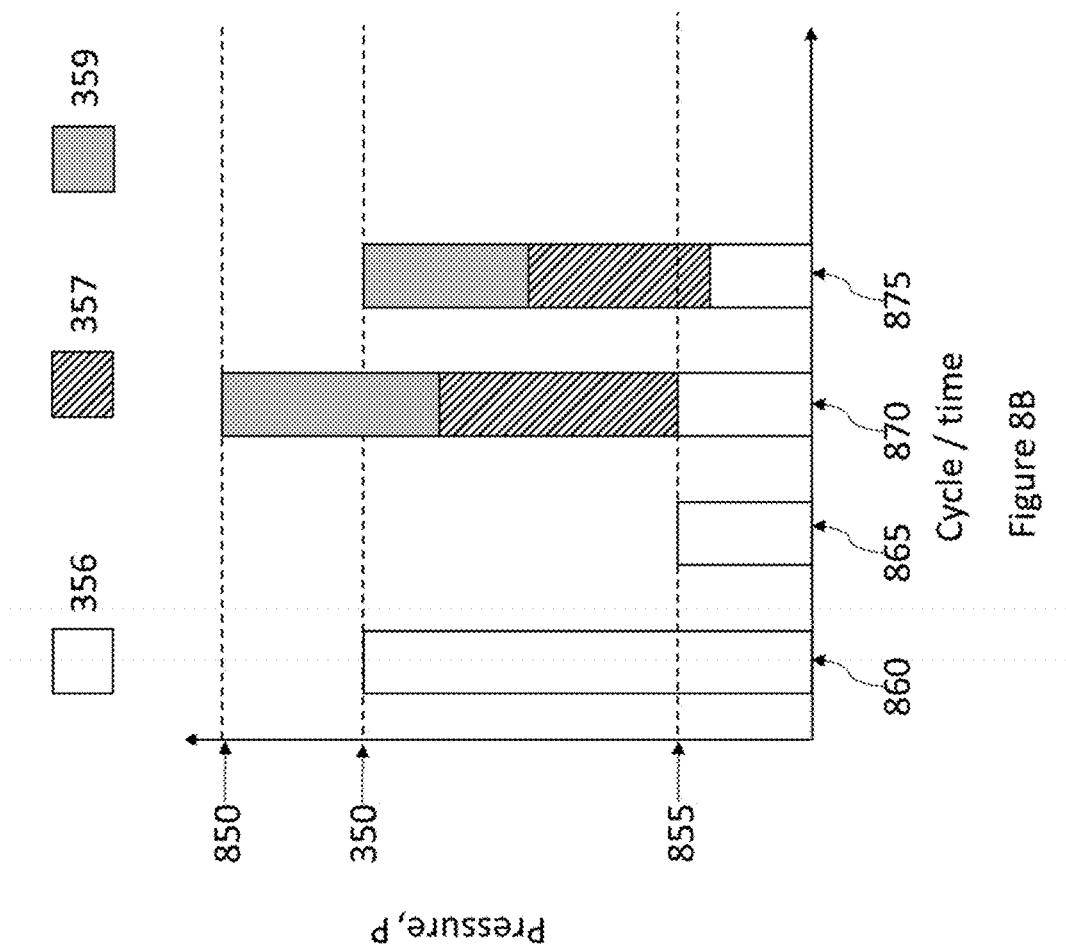
FIG. 8B is a graph depicting the increased fumigation agent partial pressure obtained following the method illustrated in FIG. 8A.
Figure 8A:
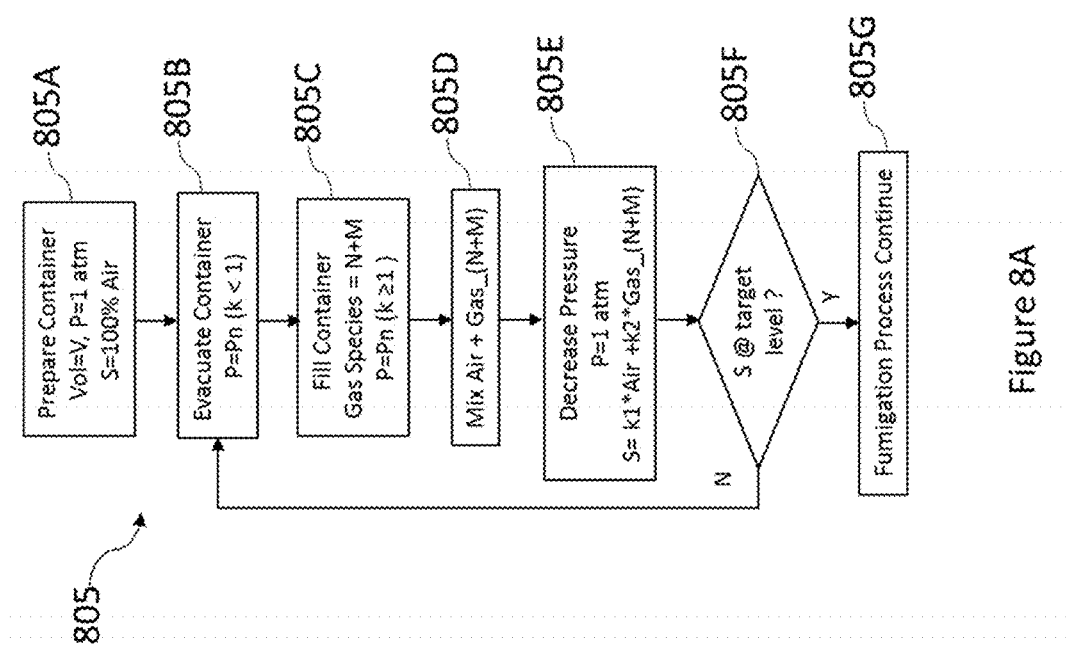
FIG. 8A is a flow chart of an evacuation method for increasing the partial pressure of a fumigation agent employing the fumigation system illustrated in FIG. 7 according to an illustrative embodiment.

Referring now to FIG. 8A, there is shown a flow chart 805 of an evacuation method for increasing the partial pressure of a fumigation agent employing fumigation system 700 in accordance with an illustrative embodiment. Referring also to FIG. 8B, there is shown a graph of the process cycle states depicting the increased fumigation agent partial pressure in the containment volume obtained following the method illustrated in FIG. 8A.

At step 805A, the containment volume 235 is filled with an ambient gas comprising air at atmospheric pressure 350. This can be seen as process cycle state 860 in FIG. 8B.

At step 805B, the containment volume 235 is evacuated by reducing the pressure of the ambient air mixture to pressure value 855 from the initial atmospheric pressure achieving process cycle state 865 as shown in FIG. 8B.

At steps 805C and 805D, the containment volume 235 is filled with the fumigant gas 705 and then the buffer gas 710 until a pressure of value 850 is achieved which is higher than atmospheric pressure. This can be seen as process cycle state 870 in FIG. 8B. In this state, the fumigation gas 705, buffer gas 710 and air will mix. In this illustrative embodiment, partial pressure contributions from the introduced fumigation gas 705 and buffer gas 710 are substantially equal as shown. As would be appreciated, however, the proportions of air 356, buffer gas 359 and fumigant gas 358 may be varied according to the fumigation process selected for the target material, the material's total mass and surface area, the fumigation reactor type, ambient temperature conditions, moisture content as well as pest concentration and type. The predetermined process gas mixture can, for example, be calculated according to a process procedure based on the aforementioned parameters and further be input to an automated process controller (as will be discussed below). In addition, based upon the process conditions measured during the fumigation process, the process gas mixture can also be varied to optimize the efficacy of the fumigation process.

At step 805E (FIG. 8A) and process cycle state (FIG. 8B), the gas mixture in containment volume 235 comprising the fumigation gas 705, buffer gas 710 and air is then allowed to attain a state of equilibrium with the environment to reduce the combined pressure in containment volume 235 to atmospheric pressure 350. As discussed above, this may occur naturally due to leakage in the containment volume 235 or alternatively may be explicitly controlled by opening containment volume 235 to the atmosphere through the operation of the various valves controlling the input and output of gas from the containment volume 235. In another example, where the containment volume 235 is substantially sealed, the fumigation process may occur at an elevated pressure as compared to atmospheric pressure 350.

At step 805F, if the partial pressure of the fumigation agent comprising the fumigant gas 705 and buffer gas 710 is not at the required level, the containment volume may be evacuated again 805B and the process repeated. When the fumigation agent is at the target partial pressure, the fumigation process may then continue at 805G.

Figures 9A, 9B:
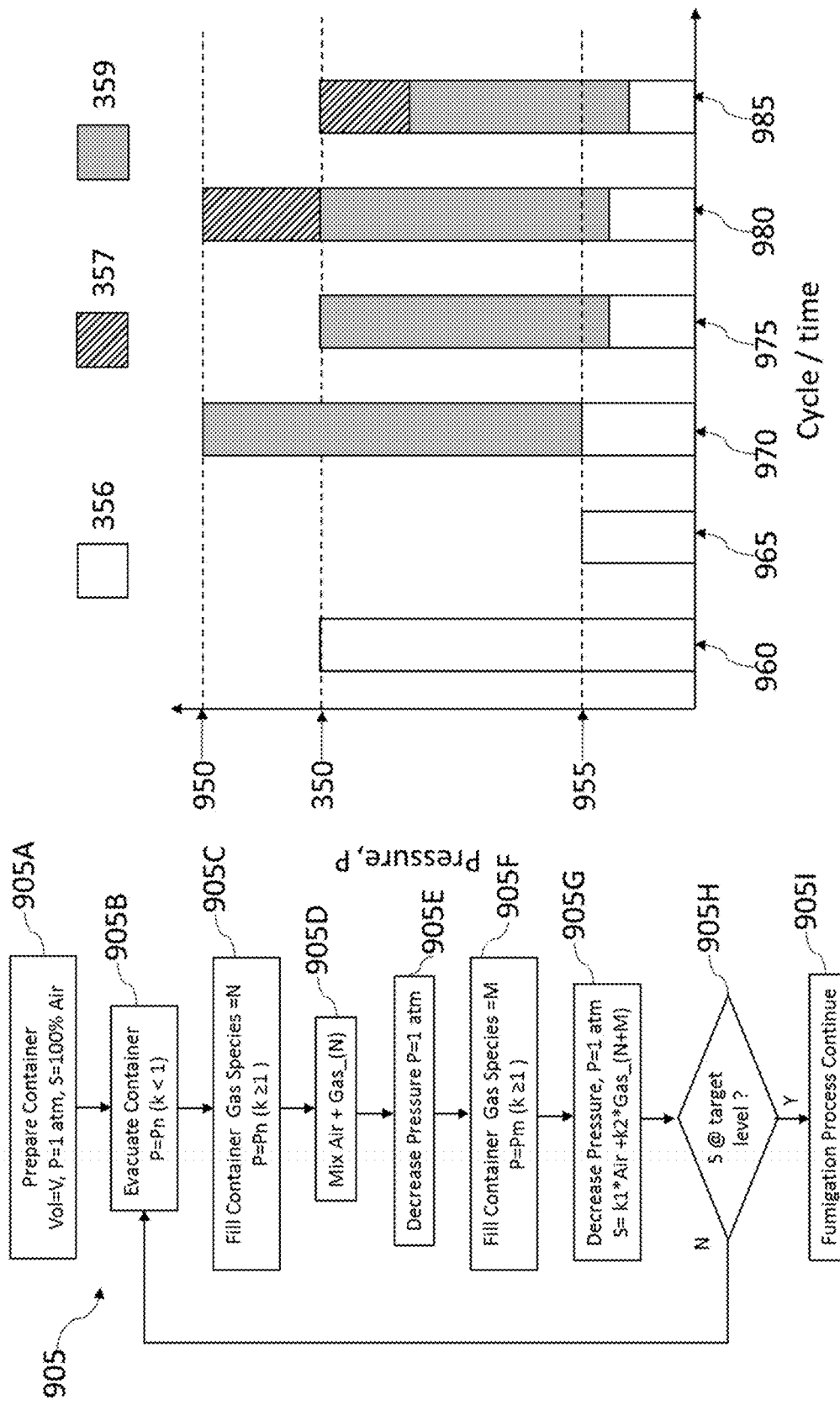
FIG. 9A is a flow chart of an evacuation method for increasing the partial pressure of a fumigation agent employing the fumigation system illustrated in FIG. 7 according to a further illustrative embodiment.
FIG. 9B is a graph depicting the increased fumigation agent partial pressure obtained following the method illustrated in FIG. 9A.

Referring now to FIG. 9A, there is shown is a flow chart 905 of an evacuation method for increasing the partial pressure of a fumigation agent employing fumigation system 700 in accordance with a further illustrative embodiment. Referring also to FIG. 9B, there is shown a graph of the process cycle states depicting the increased fumigation agent partial pressure obtained in the containment volume following the method illustrated in FIG. 9A.

In this example, at step 905A the containment volume is allowed to fill with air and attain atmospheric pressure as described previously and as shown in process cycle state 960 in FIG. 9B. Similarly, as step 905B, containment volume 235 is evacuated to pressure 955 as shown in process cycle state 965. At step 905C, buffer gas 710 is introduced into containment volume 235 until the pressure within containment volume of the combined buffer gas 710 and air mixture is at a pressure 950 that is higher than atmospheric pressure 350 as shown in process cycle state 970 in FIG. 9B. In this state, the buffer gas 710 and remaining air will mix and disperse throughout the containment volume 235.

At step 905E (FIG. 9A) and process cycle state 975 (FIG. 9B), the gas mixture in containment volume 235 is then allowed to attain a state of equilibrium with the environment to reduce the combined pressure to atmospheric pressure 350 as has been discussed previously.

At step 905F (FIG. 9A) and process cycle state 980 (FIG. 9B), fumigant gas 705 is then introduced into containment volume 235 until there is a combined pressure of value 950. At step 905G, once again the gas mixture in containment volume 235, which now contains fumigant gas 705, is allowed to attain a state of equilibrium with the environment to reduce the combined pressure to atmospheric pressure 350.

As can be seen in FIG. 9B, the partial pressure of fumigation gas 705 is now greater than the partial pressure of air in containment volume 235. At step 905H, if the partial gas pressure of the fumigation gas 705 is not at the required level then the containment volume 235 is evacuated again at step 905B and the process repeated. When the fumigation agent is at the target partial pressure, the fumigation process may then continue at 905I.

As has been discussed previously, in the example of a substantially sealed containment volume 235, the process cycle states 975 and 985 where the pressure of the containment volume is equalized to atmospheric pressure may be missed and the fumigation process than be carried out at a pressure higher than atmospheric pressure.

Referring now to FIG. 10A, there is shown is a flow chart 1005 of an evacuation method for increasing the partial pressure of a fumigation agent employing fumigation system 700 in accordance with another illustrative embodiment. Referring also to FIG. 10B, there is shown a graph of the process cycle states depicting the increased fumigation agent partial pressure obtained in the containment volume following the method illustrated in FIG. 10B.

In this method, there are two explicit evacuation steps corresponding to steps 1005B and 1005E of FIG. 10A prior to the introduction of any fumigant gas 705. Steps 1005A to 1005D and associated process cycle states 1060, 1065, 1070 and 1075 of FIGS. 10A and 10B respectively are equivalent to steps 1005A to 1005E and associated process cycle states 960, 965, 970 and 975 of FIGS. 9A and 9B respectively. In method 1005 of FIG. 10A, as compared to method 905 of FIG. 9A, there is then a further evacuation step where the pressure of the buffer gas 710 and air mixture in containment volume 235 is reduced from atmospheric pressure 350 to level 1055 before subsequent introduction at step 1005F of fumigant gas 705.

In this example, the fumigant gas 705 may be introduced until the combined pressure of the air, buffer gas 710 and fumigant gas 705 mixture is equivalent to atmospheric pressure 350 or until the combined pressure is greater than atmospheric pressure 350 and then allowed to attain equilibrium with the environment (eg, steps 1005F and 1005G of FIG. 10A). If the partial pressure of the fumigant gas 705 is below the target level at step 1005H then the second evacuation step at step 1005E may be repeated until the target level is attained at which point the fumigation process may then continue at step 1005I.

As would be appreciated, increasing or elevating the partial pressure of the fumigant gas and hence the fumigation agent in each of the above described examples relative to any ambient gas or air present in the containment volume 235 greatly assists the fumigation process due to the high fraction of toxic fumigant gas in the containment volume 235 and the improved adsorption of the fumigant upon the smooth and irregular surfaces of the material that is to be fumigated due to the higher pressure. Another benefit is that relatively higher partial pressure of the fumigant improves the distribution of the fumigant throughout the containment volume providing at least one of a more even and homogeneous application of the fumigant with higher concentration especially in large volumes such as shipping containers.

Another important advantage of increasing the partial pressure of the fumigation agent is that it assists in the capture of any residual fumigation agent. This will be discussed below.

Figure 5:
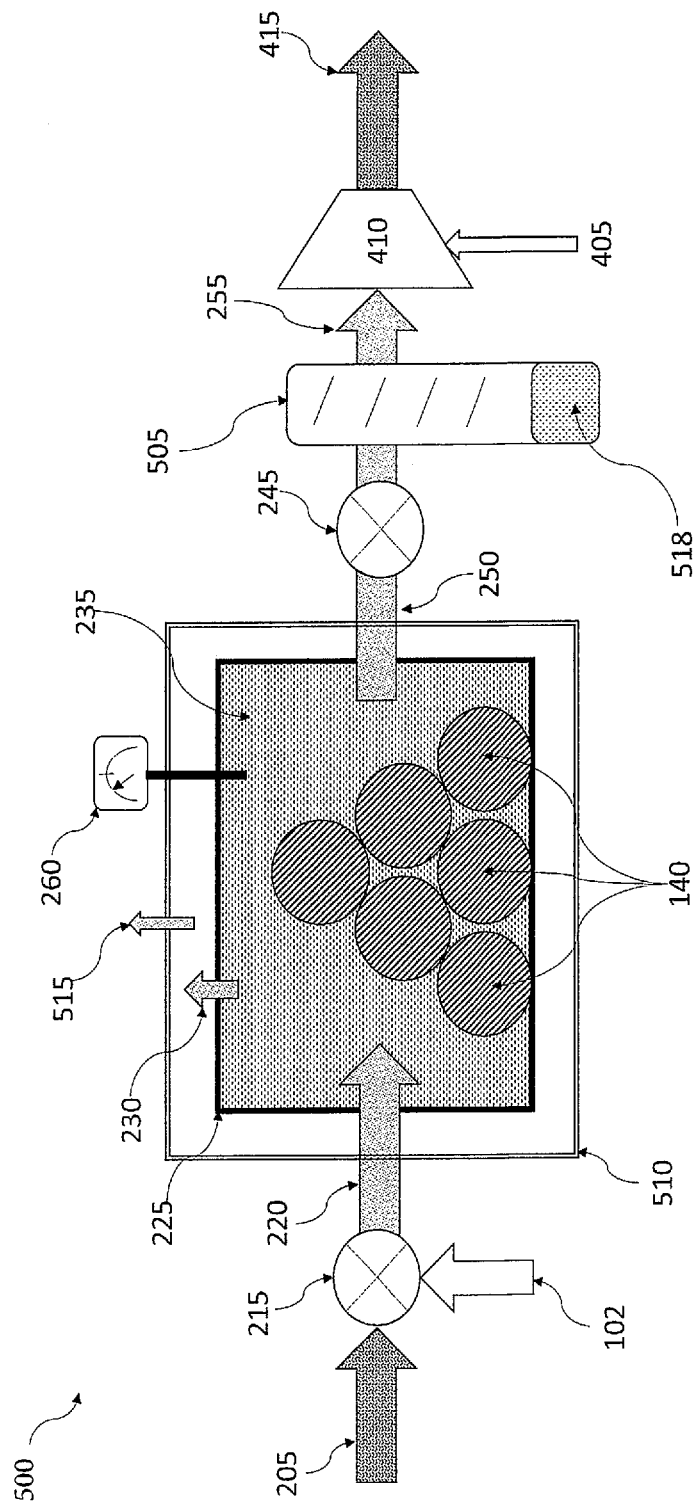
FIG. 5 is a schematic of a fumigation system according to a further illustrative embodiment.

Referring back to FIG. 5, there is shown a schematic of a fumigation system 500 in accordance with another illustrative embodiment which is adapted to reduce the leak rate of containment volume 225 to the outside environment. In one example, where containment volume 235 is contained by a shipping container 225 having a leakage rate 230 then a further containment element 510, such as a flexible shroud, may be employed to further encapsulate the container 225 where the leak rate 515 from the containment element 510 is an acceptably low value.

As would be appreciated, the fumigation of materials 140 may include products such as wood, timber and other materials with high levels of dust and particulates. Fumigation system 500 includes an optional dust filter or trap 505 provided in the exhaust process gas stream 250 that reduces the amount of dust that enters pumping system 415 and any subsequent fumigant capture process. Trapped dust 518 may be removed periodically or once the fumigation process has completed.

Figure 11:
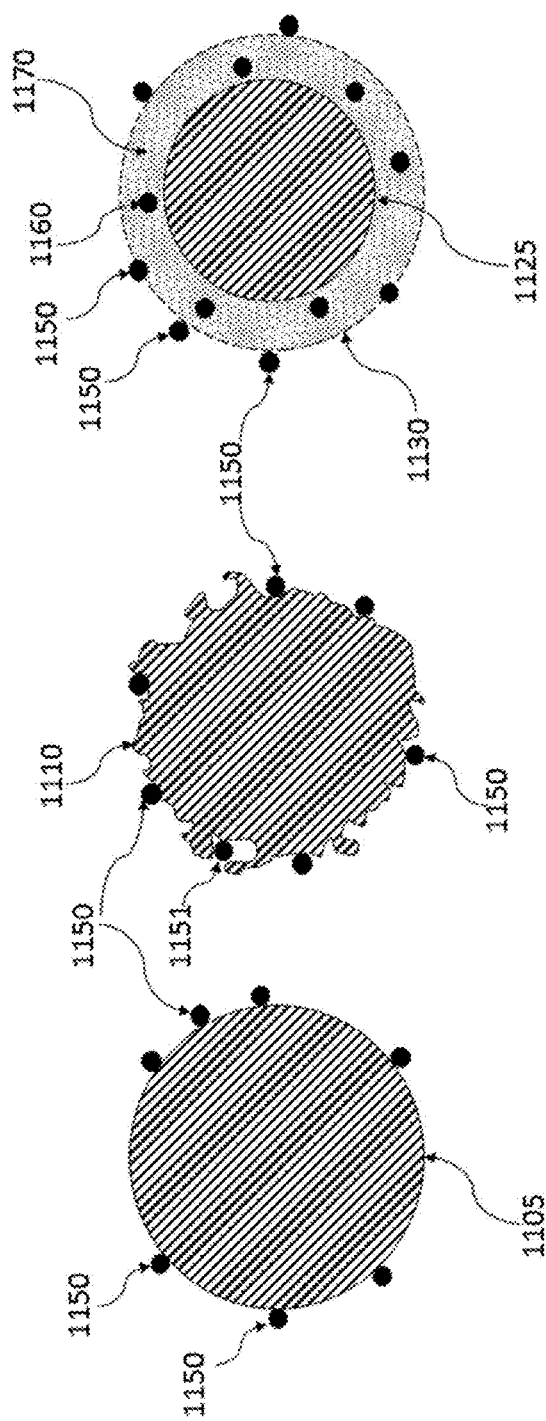
FIG. 11 is a schematic representation of the different types of material surfaces that pests and contaminants populate.

Referring now to FIG. 11, there is shown a schematic representation of the different types of material surfaces that pests and contaminants populate. Generally, there are three types of surfaces including smooth 1105, structured/rough 1120, and porous 1130 that pests and contaminates 1150 may populate. Pests 1160 may also penetrate beneath the outer surface 1130 and extend into a subsurface region 1170. It is particularly advantageous to contact the pests in all cases with sufficient partial pressure of fumigant.

Figure 12A:
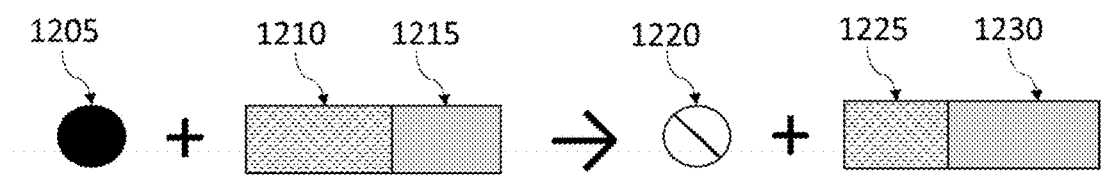
FIG. 12A is process diagram of a fumigation cycle according to an illustrative embodiment.

Referring now to FIG. 12A, there is shown a flow diagram of a fumigation cycle according to an illustrative embodiment. A pest 1205 is subjected to a fumigant agent comprising in this example of a pure fumigant 1210 and a process gas 1215 which may include components such as a buffer gas or air as has been described above. As a result of the fumigation process, the pest is soaked with a dose to produce the result of terminated pest 1220 and residual fumigant 1225 and the process gas 1230 whose constituents and concentrations may vary as a result of the fumigation process.

Figure 12B:
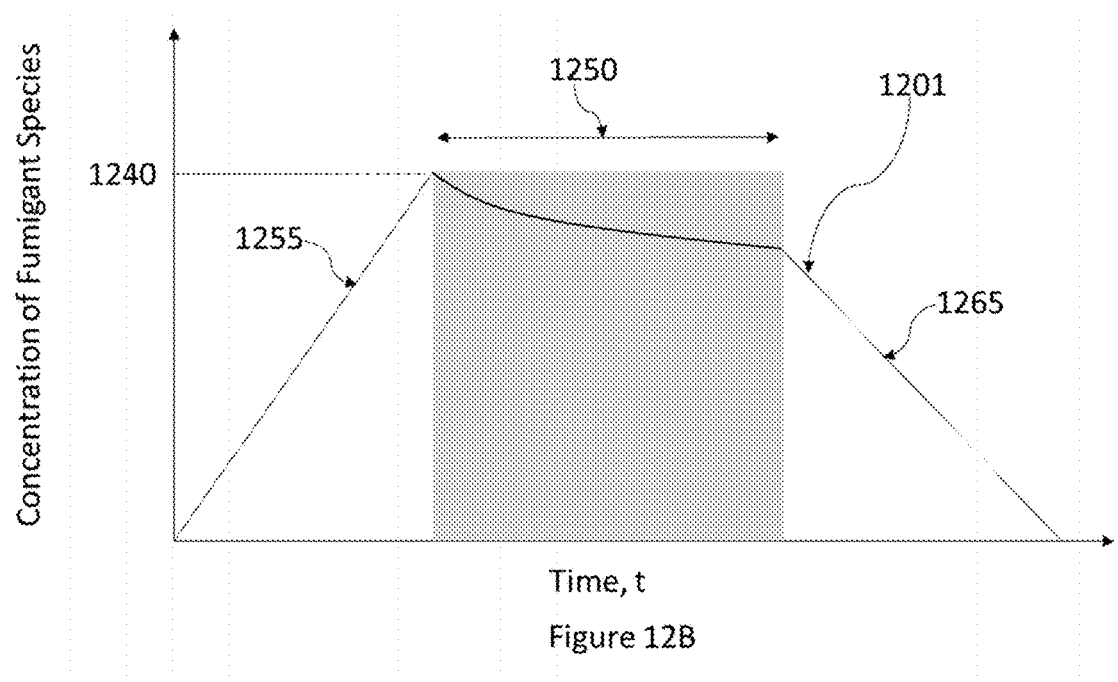
FIG. 12B is a graph of the evolution of the concentration of fumigation agent for the fumigation cycle illustrated in FIG. 12A.

Referring now to FIG. 12B, there is shown a graph of the time evolution of the concentration of fumigant within a containment volume for the fumigation cycle illustrated in FIG. 12A. The concentration of fumigant 1201 is increased as a function of time 1255 until a predetermined level 1240 is attained. Then the containment volume is substantially isolated and the product and pest are soaked with the fumigant. Once the fumigation process is completed, the final value of residual fumigant is expected to be lower than the initial value 1240, through leakage from the containment volume and/or consumption by the material and pest. Then the process chamber is vented such that the fumigant is completely extracted.

Figure 13:
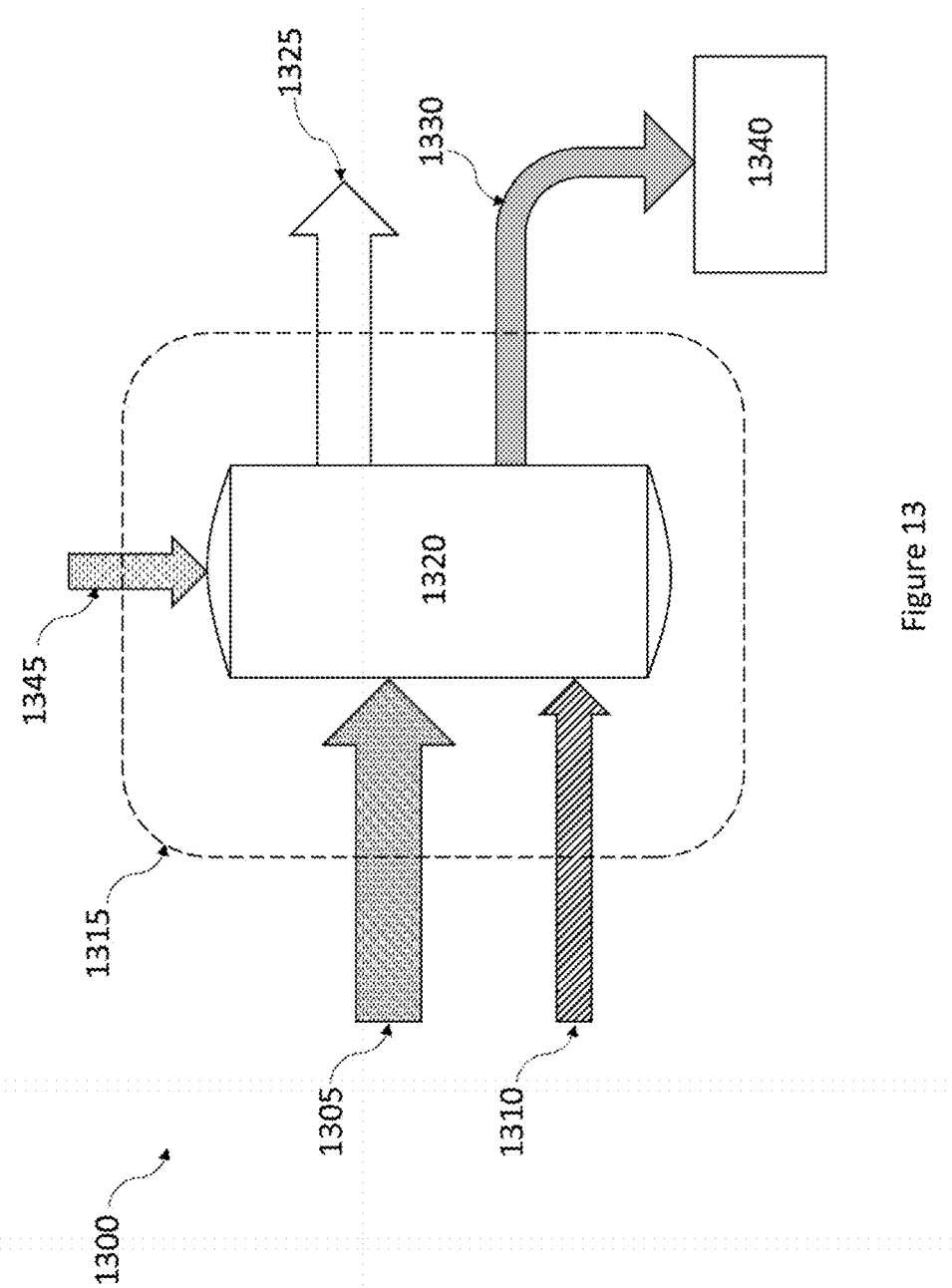
FIG. 13 is a schematic of a fumigant capture system for capturing residual fumigation agent according to an illustrative embodiment.

Referring now to FIG. 13, there is shown a schematic of a fumigant capture system 1300 for capturing residual fumigant from a fumigation system according to an illustrative embodiment. Fumigant capture module 1300 includes a capture module 1320 having as an input the vented or output fumigation gas mixture 1305 from the fumigation system following the fumigation process containing the residual fumigant to be captured and separated. Further inputs include energy 1310 which is supplied to the capture module 1320 to drive the process and in this example an active capture medium 1345 is supplied to the capture module 1320. In terms of outputs from capture module 1300, these include separated residual fumigant 1330 and by-product or exhaust gases 1325 which are emitted from the capture module 1320.

In one example, the remnant or output fumigation gas mixture 1305 is a fumigant gas mixture comprising fumigant and air. The exhaust gas rejected 1325 can be air and other non-fumigant or non-greenhouse gases or non-toxic species. The fumigant captured in process stream 1330 is then transported to another processing module 1340 that can either: (i) permanently trap the fumigant; or (ii) separate the fumigant for recycling; or (iii) separate the fumigant for subsequent disposal.

Figure 14:
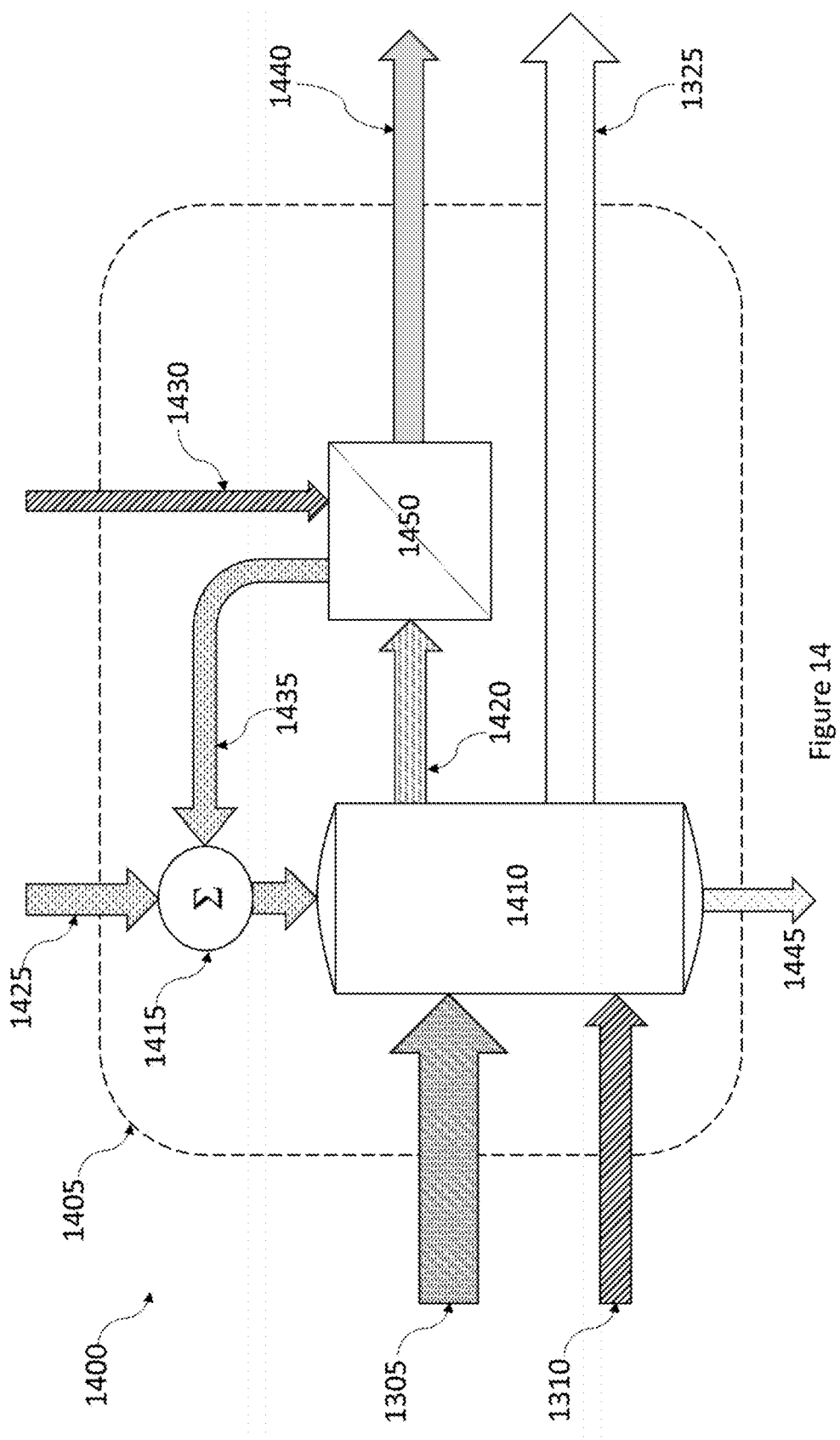
FIG. 14 is a schematic of a fumigant capture system for capturing residual fumigation agent according to another illustrative embodiment.

Referring now to FIG. 14, there is shown a schematic of a fumigant capture system 1400 for capturing residual fumigation agent from a fumigation system according to another illustrative embodiment. FIG. 14 schematically shows both the capture and separation process 1405 for a remnant or output fumigation gas mixture 1305 from a fumigation system.

In this illustrative embodiment, the fumigant capture system 1400 is based on a gas-liquid absorption process comprising an absorber module 1410 having as inputs the remnant fumigation gas mixture 1305 from a fumigation system and liquid solvent 1425 and functioning to generate two output streams comprising firstly the loaded liquid solvent with selectively absorbed residual fumigant 1420 and secondly the by-product or exhaust gases 1325. The output fumigation gas mixture 1305 may be characterized by a ratio δ, where δ=1 indicates a gas mixture comprising pure fumigant gas.

In this illustrative embodiment, absorber module 1410 comprises a gas-liquid interface absorption column consisting of a plurality of trays each holding liquid solvent 1425 providing a series of stages for fumigant capture along the absorber column axis corresponding to the gas flow direction. In this manner, the liquid solvent 1425 presents a sufficient surface area to the remnant fumigation gas mixture 1305 to enable substantial selective absorption of the pure fumigant gas and thus remove the fumigant gas from the remnant fumigation gas mixture 1305 inputted into absorber module 1410. In one example, absorber stage 1410 is designed to provide 90% or greater depletion of fumigant gas from the output fumigation gas mixture 1305.

In this example, fumigation capture system 1400 further includes a separation module 1450 which processes the loaded liquid solvent containing the absorbed remnant fumigant gas 1420 outputted from absorber module 1410 to separate the fumigant from the loaded liquid solvent in the process regenerating the liquid solvent 1435 into an active state ready for further fumigant capture. In this example, regenerated liquid solvent 1435 from separation module 1450 is fed back to input solvent regulator 1415 to be combined with new liquid solvent 1425 as required. Absorber module 1410 may also produce waste products or exothermic energy 1445. The separated fumigant 1440 may then be contained or destroyed to limit direct venting to the environment.

In one example, the fumigant may be Sulfuryl Fluoride ($SF_2O_2$) which is captured by fumigant capture system 1400. As would be appreciated, Sulfuryl Fluoride ($SF_2O_2$) gas has proven highly effective in treating a wide range of pests and providing quarantined materials suitable for large scale worldwide transportation of goods. Sulfuryl Fluoride is generally accepted as the preferred method for above-ground termite control including above ground nests, wood-infesting beetles and household pests such as, Carpenter ants (*Camponotus* spp.) and cockroaches.

In this example, liquid solvent 1425 may be based on amine-based chemistry, ammonia, or other liquid. In this example, the separated fumigant 1440 containing substantially toxic sulfuryl fluoride may be recycled or destroyed by flame and water hydrolysis. A preferred method for halide-based destruction is extremely high temperature decomposition which is possible using high temperature plasma-based reactor.

In another embodiment, module 1410 is an adsorber module based on a gas-solid adsorption process (see FIG. 16B below).

Figure 15:
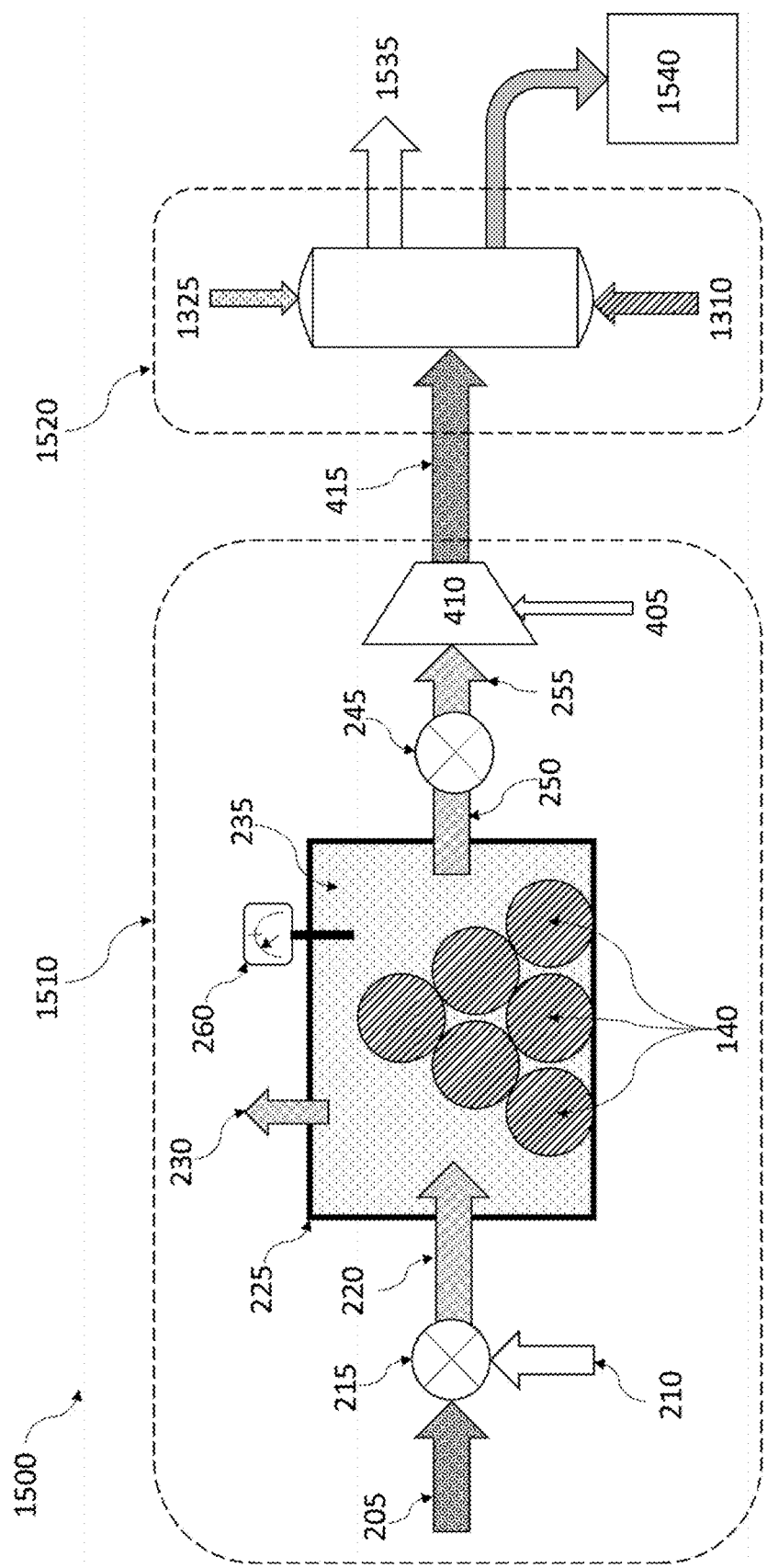
FIG. 15 is a schematic of a combined fumigation and capture system incorporating the fumigation system illustrated in FIG. 4 according to an illustrative embodiment.

Referring now to FIG. 15, there is shown a schematic of a combined fumigation and capture system 1500 incorporating the fumigation system 1510 illustrated in FIG. 4 coupled to fumigant capture system 1520 in accordance with an illustrative embodiment. As would be appreciated, the fumigant capture systems such as described above with respect to FIGS. 13 and 14 may be readily coupled with the fumigation systems described above with respect to FIGS. 2, 4, 5 and 7 as well as prior art fumigation arrangements such as described with respect to FIG. 1.

Figure 16A:
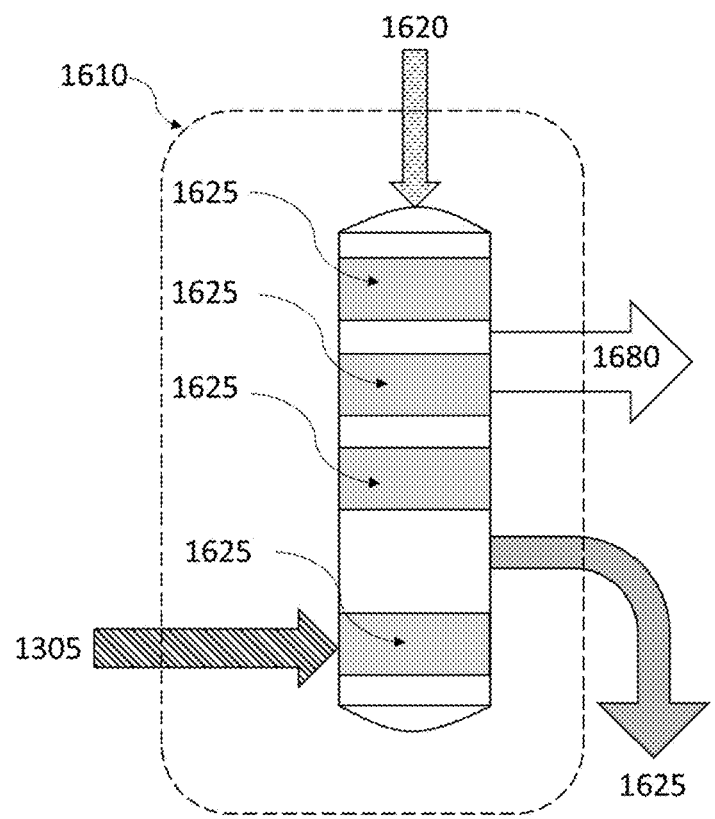
FIG. 16A is a schematic of a fumigation capture module based on gas-liquid absorption according to an illustrative embodiment.

Referring now to FIG. 16A, there is shown a schematic of a fumigation capture module 1610 based on a gas-liquid absorption process according to another illustrative embodiment. In this illustrative embodiment, absorber module comprises a column consisting of a plurality of absorber sections 1625 that each depletes a portion of the output fumigation gas mixture 1305 selectively of fumigant. The treated or by product gas stream 1680 is then substantially free of the captured toxin or fumigant and safe for venting to the atmosphere. In this example, the captured fumigant is contained within the absorber sections 1625 whose liquid solvent may be subsequently processed for recycling or disposal. The input liquid solvent 1620 is input into the absorption module and may be sprayed, atomized and or otherwise deployed on the plurality of trays or absorber sections 1625 within the column to provide a sufficient surface area for the gas-liquid reaction to occur.

Figure 16B:
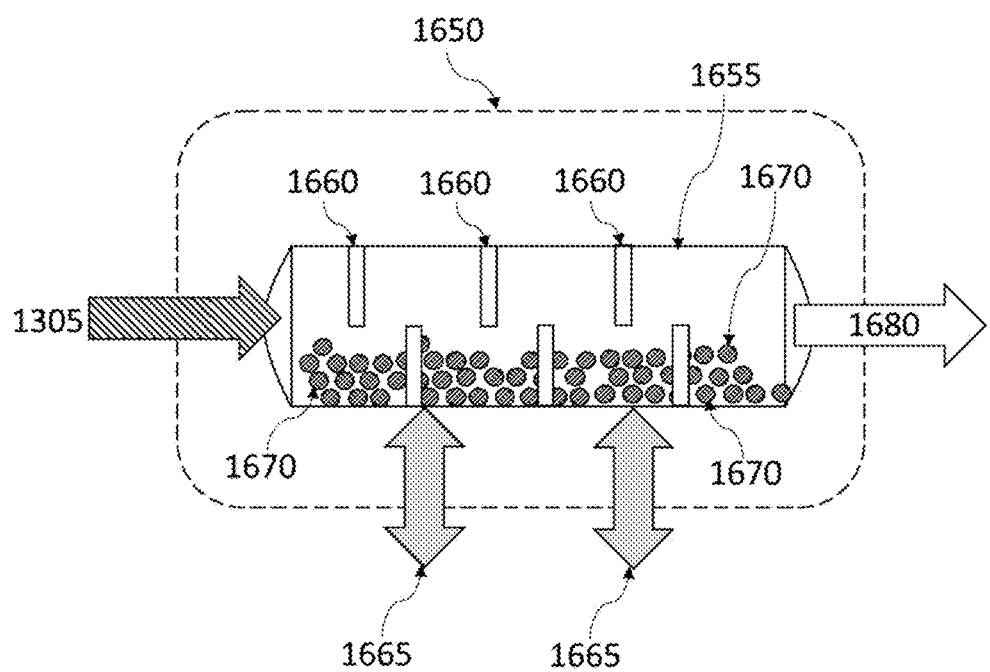
FIG. 16B is a schematic of a fumigant capture module based on gas-solid adsorption according to another illustrative embodiment.

Referring now to FIG. 16B, there is shown a schematic of a fumigation capture module 1650 based on gas-solid adsorption according to a further illustrative embodiment. Gas-solid adsorption processes may use high surface area materials, such as powders, porous solids, zeolites and the like, providing a substantially selective adsorption process for the residual fumigant present in the output fumigation gas mixture.

In another embodiment, gas-solid adsorption type fumigation capture module 1650 may be a fluidized bed reactor 1655 which may include one or more inwardly extending baffles 1660 along the horizontal axis to improve process gas reaction with the adsorbent 1670. Energy 1665 is typically consumed in the process and is in the form of altering the pressure and/or temperature of the reactor 1655. Pressure swing adsorption and temperature swing adsorption may be employed for fumigant capture and subsequent release.

In one example, residual fumigant gas contained in gas flow 1305 is injected at high pressure into adsorption module 1650 onto a selective sorbent surface 1670 to increase the efficiency of adsorption. Increasing the pressure within reactor 1655 by compressing the output fumigation gas mixture 1305 which consumes energy 1665 via a gas compressor stage (not shown). It is also possible to increase the adsorption rate of the sorbent 1670 by reducing the temperature of one or both of the output fumigation mixture 1305 and sorbent 1670. The temperature change also consumes energy 1655 and may be implemented via thermal modules (not shown).

The fumigants adsorbed onto the adsorbent 1670 proceeds for a sufficient amount of time and pressure and temperature in order to remove the desired amount of the residual fumigant(s). The remaining treated gas mixture 1680 may then be separated from the adsorption module 1655. The trapped fumigant within the sorbent media 1670 may then be released for post capture treatment and separation. For example, the captured fumigant from the sorbent 1670 can be released by using at least one of the following methods of:

(i) reducing the pressure within reactor 1655;

(ii) increasing the temperature to release the captured fumigant(s); or (ii) reacting the adsorbent containing the captured fumigant in a separate processing module.

In another example, the fumigant capture module may be based on the use of selective membranes for passing small molecules ($O_2$ and $N_2$) and capturing the residual fumigation agent such as $SF_2O_2$ for example. As would be appreciated, these molecular sieves or membranes may be tailored for specific fumigants and may further employ metal-organic frameworks (MOFs) which provide high selectivity adsorption for the fumigation agents.

It has been found by the Applicant that output fumigation gas mixtures where the partial pressure of the fumigant or fumigation agent containing the active fumigant is elevated compared to the ambient gas pressure results in increased effectiveness of both capture processes 1610 and 1650 based on absorption and adsorption respectively. In one example, partial pressures elevated in excess of 25% relative to the original ambient air environment have been found to be effective. In another example, partial pressures elevated in excess of 30% relative to ambient air have been found to be effective. In yet another example, partial pressures elevated in excess of 50% relative to ambient air have been found to be effective.

Along with the benefits of enhancing the fumigation process as outlined above, this is another advantage or benefit to elevating the partial pressure of the fumigation agent with respect to the original ambient gas present in the containment volume as it also assists the post fumigation capturing process to separate the fumigation agent from the environment.

This may be understood by considering the following. Let a mixture of gases be defined as each gas having a partial pressure $P_i$ which is the hypothetical pressure of that gas if it alone occupied the volume of the mixture at the same temperature. To a good approximation, Dalton's law relates the total pressure $P_T$ of a mixture of ideal gases as being equal to the sum of the partial pressures (ie, $P_T = \Sigma P_i$) of the individual gases in the mixture. Ideally the ratio of partial pressures equals the ratio of the number of molecules. That is, the mole fraction $m_i$ of an individual gas component in an ideal gas mixture can be expressed in terms of the component's partial pressure or the moles of the component. That is, the relation $m_i = P_i/P_T = N_i/N_T$ is valid.

The partial pressure of an individual gas component in an ideal gas can thus be obtained using this expression $P_i = m_i \cdot P_T$, where $m_i$ is the mole fraction of any individual gas component in a gas mixture, $N_i$ is the moles of any individual gas component in a gas mixture, and $N_T$ is the total moles of the gas mixture. Clearly, the mole fraction of a gas component in a gas mixture is equal to the volumetric fraction of that component in a gas mixture. Defining partial pressures as above, it is then more preferable for the fumigant partial pressure $P_{fum}$ to be in excess of 30% relative to all other gases in the process stream 1305.

It is yet more preferred for the fumigant partial pressure to be in excess of 50% relative to all other gases in the process stream 1305. It is even more preferable for the fumigant partial pressure $P_{fum}$ to be in excess of 75% relative to all other gases in the process stream 1305.

For example, let the total pressure $P_T = P_{fum} + P_{buffer} + P_{air}$, where $P_{fum}$ is the partial pressure of the fumigant species, $P_{buffer}$ the partial pressure of buffer gas and $P_{air}$ the partial pressure of air. The fumigation agent can also be defined as is the gas mixture $P_{fum} + P_{buffer}$ relative to air present during the fumigation process depending on its composition.

Referring once again to fumigation capture modules 1410, 1610 illustrated in FIGS. 14 and 16A based on a gas-liquid absorption process, liquid solvent based absorber liquids that may be used for fumigant capture include, but are not limited to:

Class A: Ethanolamines/Alkyl or Alkanolamines, and

Class B: Morpholine/Alkyl or Morpholines/Derivatives.

In relation to halide-based and sulfur-based fumigants, the liquid solvent based absorber liquids may include, but are not limited to, the following Class A compounds, namely:

(i) MONOETHANOLAMINE: MEA, Amino-2-Hydroxyethane, Aminoethyl alcohol, 2-Ethanolamine, Aminoethanol, 2-Hydroxyethylamine, $C_2H_7NO$ (ii) DIETHANOLAMINE: DEA, Diethanolamin, 2-2'Iminobisethanol, Bis(2-Hydroxyethyl)amine, Di(2-Hydroxyethyl)amine, Iminodiethanol, $C_4H_{11}NO_2$ (iii) TRIETHANOLAMINE: TEA (Pure), 2,2'2", Nitrilotriethanol, Tris(2-Hydroxyethyl)amin, $C_6H_{15}NO_3$ (iv) N-METHYL ETHANOLAMINE: MMEA, 2-Methylaminoethanol, Methylethanolamin, (2-Hydroxyethyl)methylamin, 2-(Methylamino)ethanol, Methyl Hydroxyethyl Amine, $C_3H_9NO$ (v) METHYL DIETHANOLAMINE: MDEA, N-Methyl diethanolamin, 2,2'Methyliminodiethanol, N-methyl diethanolamine, Methyldiethanolamine, N,N-Bis(2-Hydroxy ethyl)methylamine, Methyldiethanolamin, $C_5H_{13}NO_2$ (vi) DI METHYL ETHANOLAMINE: DMEA, N'N'Dimethylethanolamin, Dimethylamino-2-ethanol, 2-(Dimethyl)-1-Ethanol, 2-(imethylamino)ethanol, $C_4H_{11}NO$ (vii) DI ETHYL ETHANOLAMINE: DEEA, N'N'Dimethylethanolamin, Dimethylamino-2-ethanol, 2-(Dimethyl)-1-Ethanol, 2-(imethylamino)ethanol, $C_6H_{15}NO$ (viii) N-ETHYL ETHANOLAMINE: 2-Ethylaminoethanol, Ethylethanolamin, (2-Hydroxyethyl)ethylamin, 2-(Ethylamino)ethanol, Ethyl Hydroxyethyl amine, $C_4H_{11}NO$.

It has also been found by the Applicant that amine-based vapors are also effective fumigants for various pests. This is further advantageous, as the post capture fumigation of amines can be, for example, be captured using water-based solvents.

For example, it has been found by the Applicant that pure $SF_2O_2$ reacting with aqueous MEA can proceed with some of the following reaction matrix (other pathways may also occur):

2 $CH_2H_7NO(aq)$+11 $SF_2O_2$+6 $HSO_4^+$<=>2 $CO_2(aq)$+2 $SF_2ON$+6 $SF_2O^+$+9 $H_2SO_4$+6 HF;

3 $(CH_2H_7NO)COO^-(aq)$+15 $SF_2O_2$+11 $HSO_4^+$<=>6 $CO_2(aq)$+3 $SF_2ON$+8 $SF_2O^+$+15 $H_2SO_4$+8 HF;

6 $HCO_3^-$ (aq)+4 $SF_2O$++2 $HSO_4^+$<=>6 $CO_2(aq)$+3 $SF_2O_2$+3 $H_2SO_4$+2 HF;

6 $COO^-$ (aq)+2 $SF_2O$++4 $HSO_4$++2 HF<=>6 $CO_2(aq)$+3 $SF_2O_2$+3 $H_2SO_4$;

6 $CO_3^{2-}$ (aq)+8 $SF_2O$++4 $HSO_4^+$+2 HF<=>6 $CO_2(aq)$+9 $SF_2O_2$+3 $H_2SO_4$;

6 $OH^-$ (aq)+4 $SF_2O^+$+2 $HSO_4^+$<=>3 $SF_2O_2$+3 $H_2SO_4$+2 HF;

3 $H^+$ (aq)+3 $SF_2O_2$<=>2 $SF_2O^+$+$HSO_4^+$+2 HF;

6 $(CH_2H_7NO)H^+$ (aq)+39 $SF_2O_2$+16 $HSO_4^+$<=>6 $CO_2$ (aq)+6 $SF_2ON$+22 $SF_2O^+$+27 $H_2SO_4$+22 HF;

$CO_2(g)$<=>$CO_2(aq)$;

2 $H_2O$+$SF_2O_2$<=>$H_2SO_4$+2 HF;

3 $SFO_2^+$+HF<=>2 $SF_2O^+$+$HSO_4^+$;

$3SO_2$+2 $HSO_4^+$+4 HF<=>2 $SF_2O^+$+3 $H_2SO_4$;

Clearly, post capture handling of at least one of hydrofluoric (HF) acid, sulfur dioxide ($SO_2$) and sulfuric acid ($H_2SO_4$) may be required and can be adequately abated using water dilution or standard abatement systems. Other compounds are also possible. However, commercially available compounds are preferred as fumigant capture process because they represent a path for low operating cost and widespread acceptance with known material and safety handling protocols.

It is found the absorption of gas-phase halide-based and sulfur-based fumigants into the aforementioned Class A solvents is acceptable for the fumigant capture processes described above. More preferred are the use of simple MEA and MDEA due to their commercial availability and lower cost. It has also been determined that fluoride-based fumigants such as SF can also be absorbed using other solvents, such as ammonia ($NH_3$) based solvents. Ammonia capture solvent for SF represents and improved process as ammonia may be diluted with water and recycled.

For example, possible reaction pathways for capturing $SF_2O_2$ in aqueous ammonia may proceed as:

3 $SF_2O_2$+2 NH+2 OH<=>2 $NF_3$+3 $SO_2$+2 $H_2O$

3 $SF_2O$+2 NH+8 OH<=>2 $NF_3$+3 $SO_2$+5 $H_2O$

3 $SF_2ON$+5 OH<=>2 $NF_3$+3 $SO_2$+$NH$+2 $H_2O$

3 $SFO_2N$+2 $H_2O$<=>$NF_3$+3 $SO_2$+2 NH+2 OH

3 F+NH+OH<=>$NF_3$+$H_2O$

N+$H_2O$<=>NH+OH

3 HF+NH+4 OH<=>$NF_3$+4 $H_2O$

3 $NF2$+$H_2O$<=>2 $NF_3$+NH+OH

3 $NF_2H$+2 OH<=>$2NF_3$+NH+$2H_2O$ $NH_3$+2 OH<=>NH+2 $H_2O$ $H_2$+2 OH<=>2 $H_2O$

H+OH<=>$H_2O$ $NH_2$+OH<=>NH+$H_2O$

As would be appreciated, the ability of a liquid solvent to preferentially or selectively absorb the target fumigant with respect to air is advantageous. The liquid and gas temperatures, concentration of the active absorber compound in the solvent, the solvent solution host matrix and the concentration of the fumigant species to be absorbed and initially provided in the fumigation process gas stream, and others, are all variables which may be further optimized to achieve a desired rate of fumigant capture using an absorption based solvent process. Multiple active liquid solvents may be also be used within the same process module or sequential absorption stages.

Yet a further example active absorber compound that is possible for selective absorption of halide-based gas include absorber compounds capable of creating chloro-fluorinated compounds by virtue of absorbing the target halide based gas. As an example, SF may be absorbed with a solvent comprising a hydrocarbon (eg, liquid acetonitrile $CH_3CN$) and a chloro-hydrocarbon compound. The products of the gas-liquid absorption process may also include hydrogen fluoride and chloro-fluorinated compounds which may then be separated from the solvent and as a result remove the target halide species from the process gas stream 255.

FIG. 16C is a graph 1690 of residual fumigant capture as a function of the fumigant fraction in the output fumigation gas mixture following fumigation for halide-based fumigants using various solvent absorber liquids, such as MEA, MDEA and ammonia as described above.

An example embodiment of a fumigant gas capture process is now described involving a remnant fumigation gas mixture consisting of the fumigant sulfuryl fluoride (SF) and air.

In this embodiment, fumigant capture is achieved using a gas-liquid absorption type capture module using a packed absorption column of diameter D and height H similar to that described in FIG. 16A. In this embodiment, the liquid solvent is a MEA liquid. For a gas-liquid phase absorption column, it is advantageous to create the highest possible contact between the two phases for an extended period of time. The absorption column in this embodiment is configured such that the gas is injected from the bottom of the column and flows or diffuses to the top of the column and the liquid solvent is configured to flow in a countercurrent manner to the gas flow. This may be achieved by using an equilibrium or packed absorber column design as will be described below.

The first stage of the packed absorber column design optimizes to first order the dimensions of the absorber column based on gas and liquid flow rates. The maximum gas flowrate within the liquid absorber column is determined by the maximum liquid flow rate. The maximum process gas velocity may then be estimated which is termed the flooding velocity. Note, for process gas streams which exceed the flooding velocity, the liquid solvent is in general trapped at the uppermost portion of the absorption column, and thus a higher liquid pressure is required to force the solvent into the system. To prevent the disadvantageous solvent accumulation at the top of the absorption column and minimize solvent wastage that is expelled in the exit gas stream it is preferred the gas velocity $v_{gas}$ be substantially less than the flooding velocity, $v_{flood}$. It has been found by the Applicant that favorable designs may be achieved by selecting the criteria for $v_{gas} = 0.5 \times v_{flood}$.

Simplistically, the gas mass flow or gas volumetric flow (GVF) of the process gas stream is a set parameter that is based upon the evacuation time scale and volume of the fumigation process chamber to be treated post fumigation. The absorber column diameter D or equivalently the cross-sectional area A is therefore selected to accommodate the required GVF.

The relation between the GVF, gas velocity $v_{gas}$ and cross-sectional area A is given by:

$$GVF = v_{gas} \times A = v_{gas} \times \pi \left(\frac{D}{2}\right)^2 \quad \text{Equation 1}$$

That is, to reduce the process gas velocity in the column the diameter may be increased as required.

Gas absorption towers can be configured advantageously to increase dramatically the gas-to-liquid contact area. Cylindrical absorption columns may be liquid tray type or be packed with randomly or orderly packed packing elements having increased surface areas including, but not limited to, Raschig rings, Lessing rings, Berl saddles and/or Pall rings.

The different packing element types are characterized by a packing factor $F_p$, which relates the flow resistance and the area. This is further modified if the packing elements are ordered or randomly positioned with in the column volume.

Packing element types typically formed of ceramic material or other suitably chemically inert material of appropriate shape and configuration may be used to form a fumigation gas absorption tower where the packing elements are substantially inert to and resistant to degradation and corrosion by both the solvent (for example MEA) and fumigant gas. The packing element type is further selected to allow adequate flow of both the MEA solvent and the process stream gas with an acceptable pressure drop ΔP across the absorption column.

There are several methods for designing gas absorption columns. An example embodiment is now described to demonstrate the system size and operation required for the present unique application of fumigation processing.

Figure 16D:
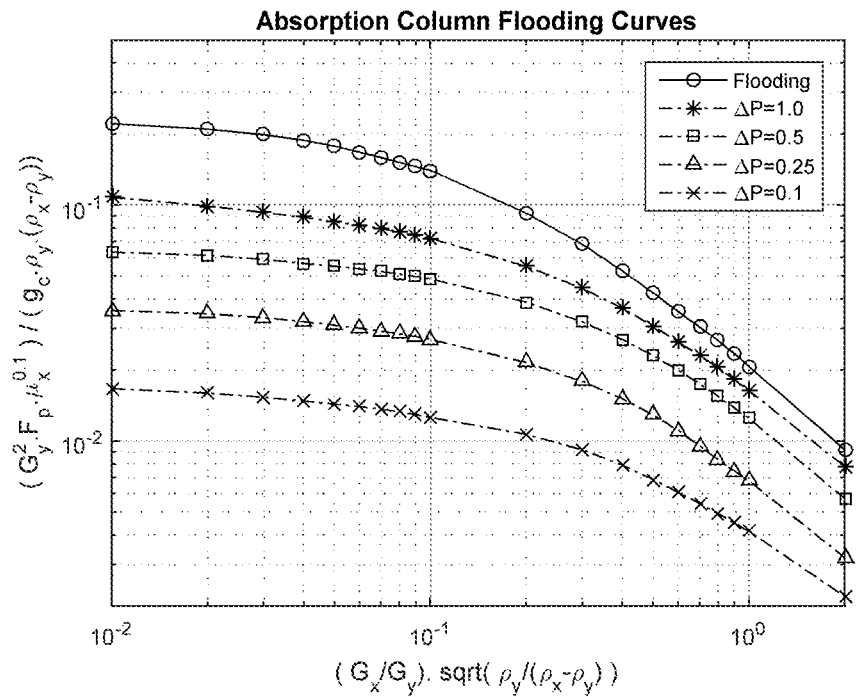
FIG. 16D is a parameterized plot of capacity factor versus flow factor for an absorption column according to an illustrative embodiment.

Referring now to FIG. 16D, there is shown a parameterized plot of capacity factor versus flow factor for an absorption column according to an illustrative embodiment.

The multi-parameter solution relating the aforementioned issues can be dealt with using a parametrization of generalized pressure-drop correlation (GPDC) for vertical and cylindrical absorption column. A modified calculation is depicted in FIG. 16D, showing the curves for capacity factor (CF) versus flow factor (FF) for various pressure drop ΔP parameters.

The capacity factor is given by:

$$CF = \frac{G_y^2 F_p \mu_x^{0.1}}{N_c \rho_x (\rho_x - \rho_y)} \quad \text{Equation 2}$$

and the flow factor is given by:

$$FF = \frac{G_x}{G_y} \sqrt{\frac{\rho_x}{\rho_x - \rho_y}} \quad \text{Equation 3}$$

where, $G_x$ is the mass velocity of liquid in units [lb/ft$^2$·s] or kg/m$^2$·s], $G_y$ is the mass velocity of process gas in units [lb/ft$^2$·s], $\rho_x$ is the density of liquid solvent in units [lb/ft$^2$·s or kg/m$^2$·s], $\rho_y$ is the density of process gas in units [lb/ft$^3$ or kg/m$^3$], $\mu_x$ is the viscosity of liquid solvent in units of [cP or Pa·s], the packing factor $F_p$ in units of [ft$^{-1}$ or m$^{-1}$] and Newton's proportionality factor $N_c$=32.2 [lb·ft/lb$_f$·s$^2$] or 9.8 [kg·m/kg$_f$·s$^2$].

For a given fumigant and solvent pair the ratio of the mass velocities $G_x/G_y$ can be selected for desired process or determined to achieve a desired process by comparing graphically with the curves provided in FIG. 16D. The limiting case being the theoretical flood velocity as described earlier.

In one example, a fumigation containment volume, is selected from a standard 40 ft Dry Hi-cube Steel shipping container which has interior dimensions of approximately 39 ft×7 ft×8 ft and thus a volume V=2184 ft$^3$. Fumigation of a plurality of such containers is sought and thus 10 containers represents a swept fumigation gas volume $V_n$=10×V=22,000 ft$^3$. That is, the fumigation reactor volume comprises ten 40 ft Dry Hi-cube Steel containers to be processed simultaneously.

For the extreme case of 10% SF in air, the molecular weight of the process gas in essentially dry air (1% humidity) is:

$$M_{gas}=0.9\times M(air)+0.1\times M(SF_2O_2)=36.3 \text{ [g/mol]} \quad \text{Equation 4}$$

where M(air) is molar weight of air (20% $O_2$/80% $N_2$) and $M(SF_2O_2)$ the molar weight of SF fumigant. If the air is humid then the molecular weight may be calculated depending on the relative humidity, pressure and temperature.

At 40° C. (as the SF absorption in MEA is exothermic) and 1 atmosphere the process gas density is calculated using the ideal gas law such that $\rho_y$=1.4113 kg/m$^3$ or 0.0881 lb/ft$^3$. The fumigant capturing MEA solvent is 30 wt % in water has a specific gravity SG=1.023 and thus $\rho_x$=1023 kg/m$^3$ or 63.8638 lb/ft$^3$ and viscosity $\mu_x$=1.3 centipoise (cP).

Letting the gas flow rate equal the liquid flow rate enables the flow factor to be calculated as:

$$FF = 1.0 * \left(\frac{0.0881}{63.8638 - 0.0881}\right)^{\frac{1}{2}} = 0.0358 \quad \text{Equation 5}$$

Referring again to FIG. 16D, the GPDC curves for the flooding velocity criteria provide the capacity factor of CP=0.1925.

If structured packing in the absorption column is used then suitable estimates for the flooding velocities can be established. That is, structured packing elements can be arranged in a predetermined pattern or symmetry that provides a substantially different flow pattern when compared to random packing element distribution within the column. The packing elements are selected from designs having high specific surface area relative to the volume $a_v$ [m$^2$/m$^3$]. For example, it is found Berl saddle packing elements having d=¼ inch and d=½ inch size are suitable and exhibit factors $a_v$=899 & 466 and $F_p$ (¼")=900 and $F_p$ (½")=240, respectively. Alternatively, lower cost packing elements such as ceramic Raschig rings may also be used with $F_p$ (¼")=1600 and $F_p$ (½")=580.

Therefore, by selecting ½ inch Raschig rings, the gas mass velocity $G_y$ can be calculated as:

$$G_y = \left(\frac{0.1925 * 32.2 * (63.8638 - 0.0881) * 0.0881}{580 * 1.3^{0.1}}\right)^{1/2} = 0.2419 \left[\frac{\text{lb}}{\text{ft}^2 \cdot \text{s}}\right] \quad \text{Equation 6}$$

Now the area A of the fumigation capture column can be calculated by virtue of the relation:

$$A = \frac{\text{mass flow rate } (MFR)}{\text{mass velocity } (v_{gas})} \quad \text{Equation 7}$$

The mass flow rate (MFR) is given by the gas volume of the fumigated container to be processed in a desired time interval, dT. Furthermore, for 10 such 40 ft containers to be post fumigation processed in parallel by a fumigation gas capture plant in time of dT=1 hour this then sets the MFR as:

$$MFR = 22,000[\text{ft}^3] * \frac{0.0881[\text{lbft}^{-3}]}{3600 \text{ sec}} = 0.5384\left[\frac{\text{lb}}{\text{s}}\right] \quad \text{Equation 8}$$

A good design rule selects the mass velocity to half the flood velocity and thus:

$$v_{gas} = \frac{1}{2} \cdot G_y = 0.1209\left[\frac{\text{lb}}{(\text{ft}^2 \cdot \text{s})}\right] \quad \text{Equation 9}$$

Based on the above, the indicated absorber column cross-sectional area is indicated to be:

$$A = 0.5384/0.1209 = 4.4533 \quad \text{Equation 10}$$

Therefore, the required fumigation capture column diameter is estimates as:

$$D = \sqrt{4A/\pi} = 2.3812 \text{ ft} = 0.7258 \text{ m} \quad \text{Equation 11}$$

The height of the fumigation capture column can also be estimated using correlation relations which is particularly useful when designing a dilute or concentrated fumigant gas absorption system. That is, correlation relations provide first order estimates for system designs and can be used provide feasibility and design guidance for fumigation capture via solvent based absorption. These mass transfer correlations are the mass transfer analogs to the heat transfer correlations of the Nusselt number in terms of the Reynolds number and Prandtl number.

For example, the following design discloses a post fumigation gas mixture comprising 1 mol % $SF_2O_2$ and 99 mol % dry air is to be treated such that the fumigant $SF_2O_2$ is separated from air using MEA as the selective absorber and the packed column as described previously. The specification for removal of the $SF_2O_2$ is that the treated exit gas stream comprise 0.05 mol % and 0.01 mol % (or less) of fumigant species and the remainder is clean air.

Using the "height of a transfer unit" (HTU)–"number of transfer units" (NTU) method (ie, the HTU-NTU method), the mass transfer between the vapor and liquid phases may be used to calculate the required height of the fumigation capture column.

Figure 16E:
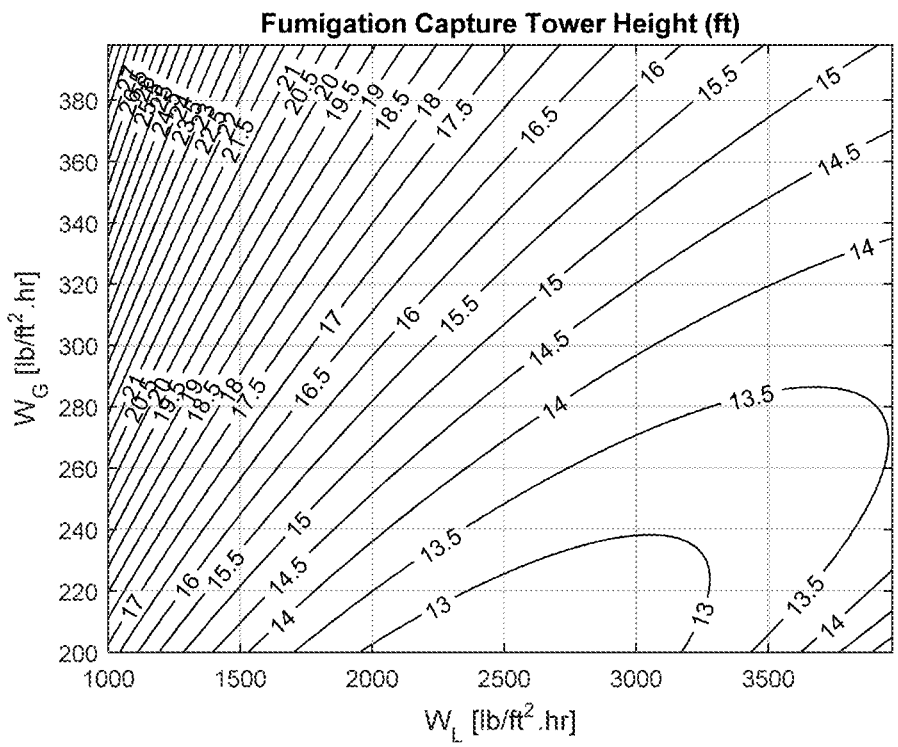
FIG. 16E is a graph depicting the absorption tower height required to clean an input gas mixture containing 1 mol % $SF_2O_2$ into an exit gas stream having 0.05 mol % $SF_2O_2$ in air as a function of the gas $W_G$ and liquid $W_L$ fluxes.
Figure 16F:
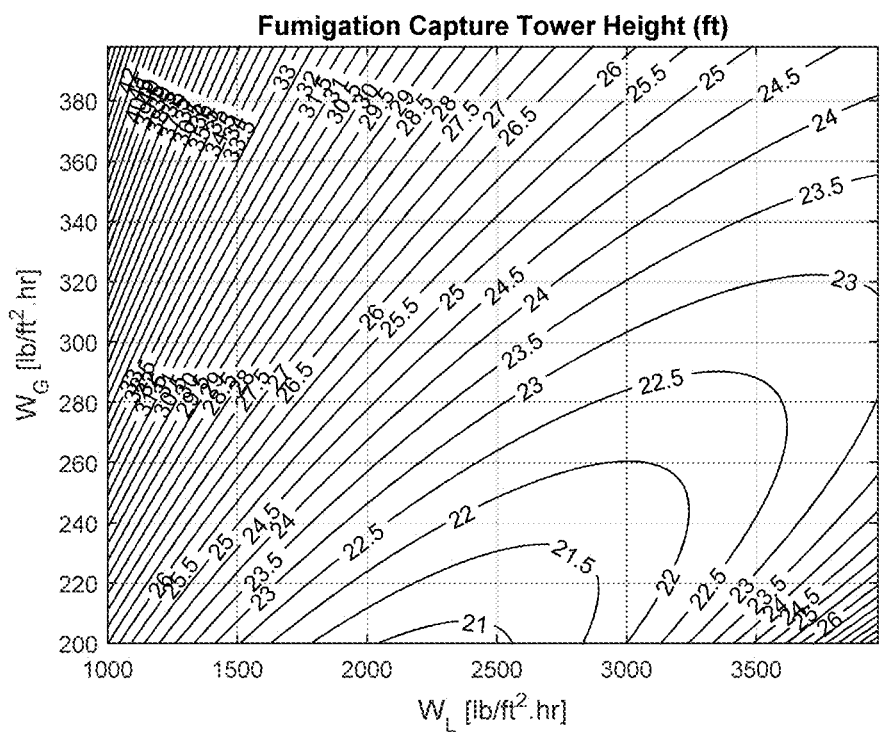
FIG. 16F is a graph similar to FIG. 16E depicting the absorption tower height required to clean an input gas mixture containing 1 mol % $SF_2O_2$ into an exit gas stream having 0.01 mol % $SF_2O_2$ in air as a function of the gas $W_G$ and liquid $W_L$ fluxes.

Referring now to FIG. 16E, there is shown a graph depicting the absorption tower height required to clean an input gas mixture containing 1 mol % $SF_2O_2$ into an exit gas stream having 0.05 mol % $SF_2O_2$ in air as a function of the gas $W_G$ and liquid $W_L$ fluxes. Referring also to FIG. 16F, there is shown a graph depicting the absorption tower height required to clean an input gas mixture containing 1 mol % $SF_2O_2$ into an exit gas stream having 0.01 mol % $SF_2O_2$ in air as a function of the gas $W_G$ and liquid $W_L$ fluxes.

In FIGS. 16E and 16F, the absorption liquid is 30 wt % MEA. The vapor-liquid equilibrium relation is taken as linear with HTU-NTU correlation relations as previously described. The diffusion coefficients for $SF_2O_2$ in MEA were estimated from gas-liquid mass transfer models. Accordingly, for a fumigant gas and liquid solvent configuration ($W_G$, $W_L$) the absorption column height can be calculated by inspection of the contours depicted in FIGS. 16E and 16F.

As would be appreciated, the fumigation capture module tower heights indicated by FIGS. 16E and 16F readily demonstrate that MEA may be used to capture $SF_2O_2$ in an economically feasible system. As would be further appreciated, the example absorption tower design using SF in air and aqueous MEA demonstrates but one possible embodiment and the design principles discussed above may be applied for the selective capture of other fumigants from output fumigation gas mixtures following fumigation of a material.

The captured fumigant in the loaded solvent may then be further processed with the solvent regenerated using a stripper module. The stripper module makes use of the volatility of the captured fumigant in the solvent and is substantially operated in the reverse process for the absorber disclosed. Recycling of the solvent in the absorber module may then further reduce the operating cost of the fumigant capture module. Alternatively, the fumigant that is captured in the loaded solvent may be treated separately in a remote system, thereby decreasing the physical system size and complexity at the fumigation site.

Figure 17A:
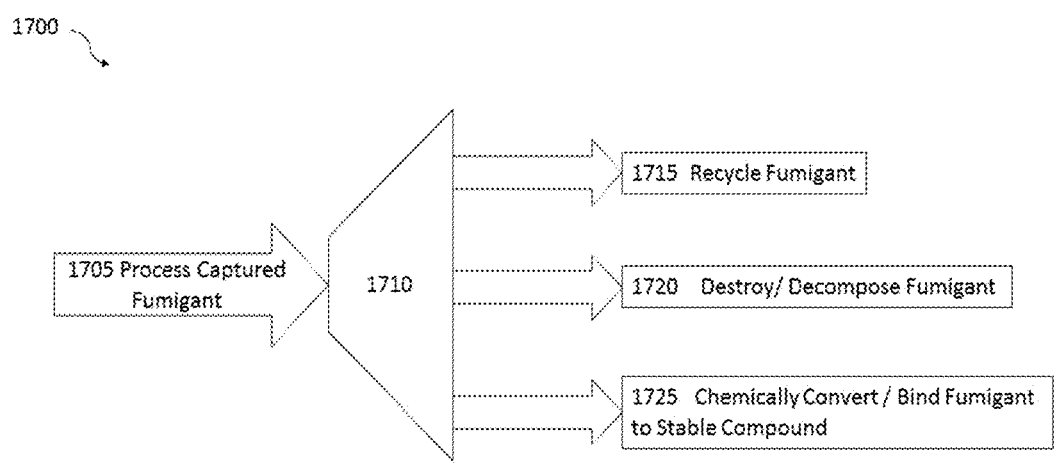
FIG. 17A is a process diagram illustrating the pathways for disposing or recycling remnant fumigant from the fumigation process according to an illustrative embodiment.

Referring now to FIG. 17A, there is shown a process diagram 1700 illustrating the pathways for disposing or recycling the remnant fumigant resulting from the fumigation process according to an illustrative embodiment. This remnant fumigant may be a component of the output fumigation gas mixture vented from the containment volume following the fumigation process or in the form of captured fumigant that has been captured or absorbed in a liquid solvent to form a loaded liquid solvent or absorbent. In another embodiment, the captured fumigant may be captured or adsorbed onto a solid adsorbent to form a loaded adsorbent.

Figure 17B:
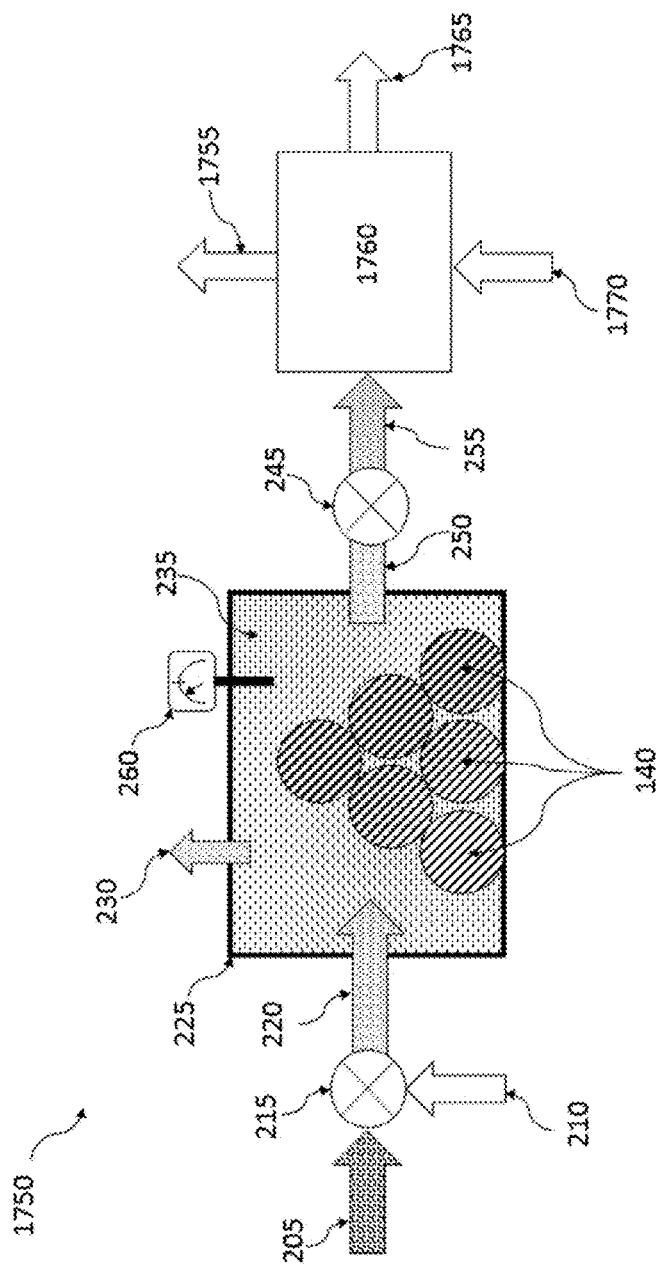
FIG. 17B is a schematic of a combined fumigation and gas abatement system according to an illustrative embodiment.

The fumigation reactor volume may be of the optimized type disclosed above or a prior art method. In one pathway, the exhausted fumigant process gas or output fumigation gas mixture 1705 may be destroyed 1720 by high temperature decomposition in module 1710. For example, referring to FIG. 17B, the post fumigation gas stream 255 is supplied directly to a high temperature plasma torch module 1760 or high temperature water plasma torch module 1760 which is used to completely destroy the fumigant process stream and convert into benign products 1765 and environmentally friendly gas stream 1755. Energy excitation for plasma module 1770 may be of high voltage arc type or radio frequency excited plasma type. That is post fumigation gas is directly treated by high temperature ignition and conversion into benign products via plasma reaction.

Yet a further method for direct treatment of fumigation process stream 255 is via the use of decomposition module 1710 comprising highly reactive radical species. For example, sulfuryl fluoride is a GHG by virtue of the reactivity with ozone and is thus considered an atmospheric ozone ($O_3$) depleting agent by virtue of the catalytic effect of the halide. Therefore, decomposition module 1710 comprising a reaction volume enabling fumigation process gas 255 to react directly with an on-site generated source of at least one of radicals, such as ozone, and optical stimulation, such as ultraviolet light, enables the direct treatment of the halide containing fumigant gas. The reaction vessel 1710 can further trap the halide into another stable form for separation as a result removing the halide form the problematic atmospheric catalytic process.

Yet a further method for direct treatment of halide-based fumigant gas is the selective excitation by microwave frequencies resonant with the chemical bonds containing the problematic halide species. Halide based compounds are considered stable compounds; however, they may participate in catalytic reactions with other compounds, thereby regenerating the problematic halide based fumigant compound. Once the halide-based compound is selectively excited and in preference the chemical bonds containing the halide atoms are excited, it is then less challenging to engineer advantageous chemical pathways to remove the halide atoms from the catalytic process and into other halide-containing compounds which may then be removed from the system.

As has been described previously, the post fumigation process gas may also be captured in a liquid solvent and supplied to process module 1710 which can selectively separate the fumigant species 1715. In this example pathway, module 1710 can be a loaded solvent separation column having as its input the loaded solvent containing the captured fumigant and operating in substantially the reverse process to the absorption column process. Again referring to FIG. 17B, post fumigation process module 1760 could be configured to separate in this example the fumigant species 1765 which can be optionally recycled and rejects the non-fumigant species 1755 to the environment. That is, the process module 1760 in this example comprises two stages, a solvent absorption module and a solvent separation module, where energy 1770 is supplied to the system (see also FIG. 14).

In another pathway, the fumigant abatement system (for example module 1760 of FIG. 17B) can also comprise an intense source of ultraviolet radiation such that the reactor process 1710 breaks down or optically excites the fumigant into states that are receptive to chemically bonding to form other non-toxic or environmental safe stable compounds 1725. As an example, $SF_2O_2$ has high absorptivity in the ultraviolet wavelength ranges of 150-300 nm along with specific far infrared absorption signatures. These optical wavelengths may be used advantageously to destroy or convert the fumigant species into environmentally benign products.

Referring again to FIG. 17B, there is shown a schematic of a combined fumigation and abatement system 1750 according to an illustrative embodiment. The post fumigation process gas or output fumigation gas mixture 255 is supplied to the abatement module 1760 which can process the remnant fumigant gas by at least one of the processes 1700 illustrated in FIG. 17. That is, the post fumigation process stream 255 can first capture the fumigant (eg, by absorption or adsorption) and then directly treat the captured fumigant or separate the fumigant for further processing 1715, or directly treat the process gas 255 by high temperature treatment 1720 for destruction or conversion into another product or chemically convert the process gas 255 as a step to forming a stable environmentally safe compound.

Yet another method for abatement module 1760 is the catalytic conversion of the fumigant 255 via high temperature process into environmentally friendly species 1765 in line with abatement process 1720 as illustrated in FIG. 17.

Yet a further method for removing the fumigant species permanently from the environment is by chemically binding with a plasticizer to form a stable solid and or liquid. For example, the captured and or separated fumigant can be chemically bound into a solid for transportation to another physically different disposal or treatment site in line with abatement process 1725 illustrated in FIG. 17.

Figure 18:
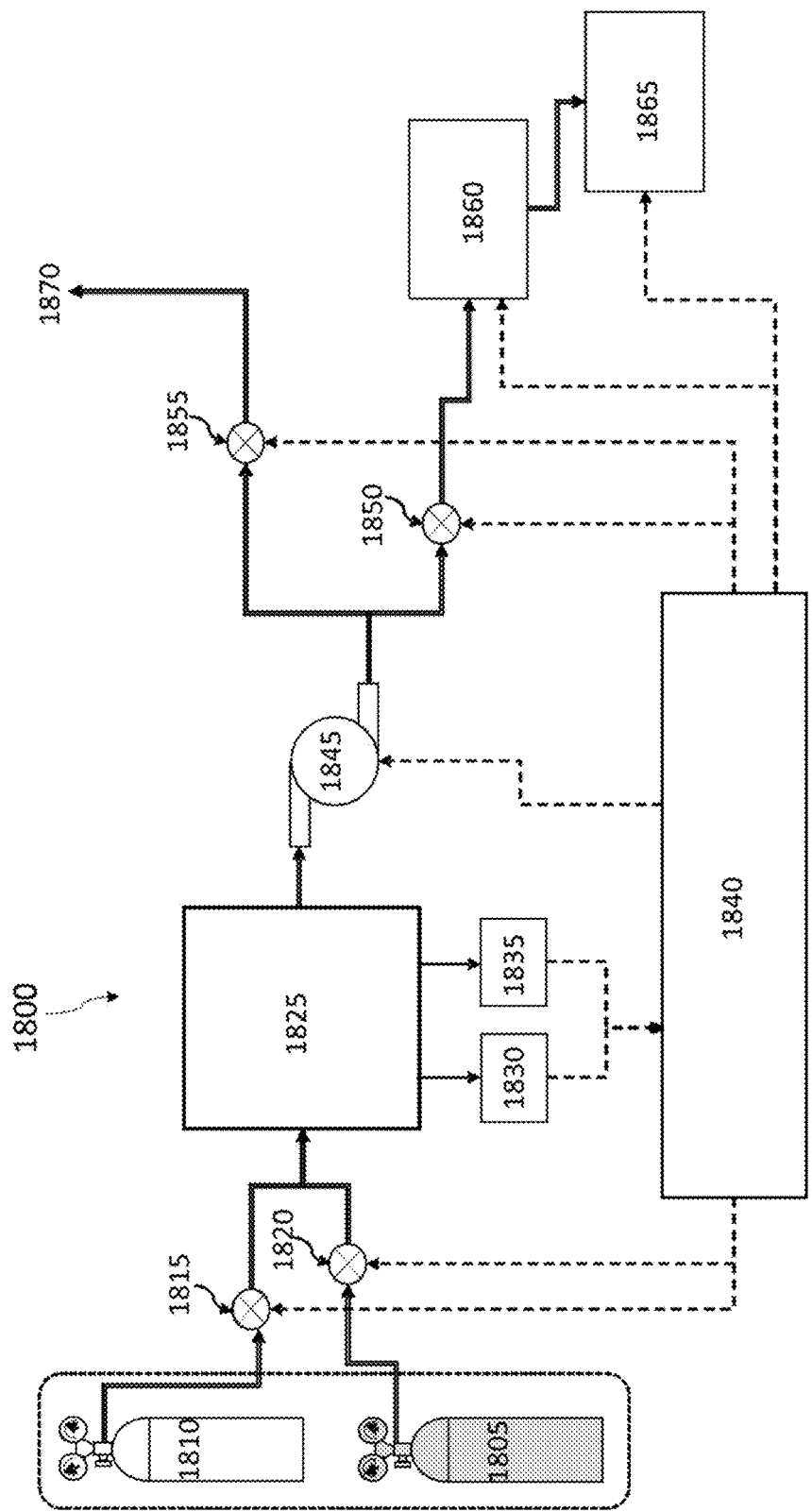
FIG. 18 is a schematic of an automated mobile combined fumigation and capture system according to an illustrative embodiment.

Referring now to FIG. 18, there is shown a schematic of an automated combined fumigation and capture system 1800 according to an illustrative embodiment. Fumigation and capture system 1800 includes a process controller 1840, a containment volume 1825, a fumigant capture module 1860 a fumigant separation module 1865, controllable pumping system 1845 and a fumigant agent input stage including a fumigant 1805 and an optional buffer gas 1810. System 1800 further includes input valves 1815, 1820 controlling the input of fumigant gas 1805 and buffer gas 1810 respectively into containment volume 1825 and output valves 1855 and 1855 controlling the output of the output fumigant gas mixture to the environment 1870 or to fumigant capture module 1860 respectively.

Containment volume 1825 includes an associated pressure sensor 1830 and fumigant species sensor 1835. As depicted in FIG. 18, the dashed lines represent control signal and communication paths between the various subsystems and process or system controller 1840.

Figure 19:
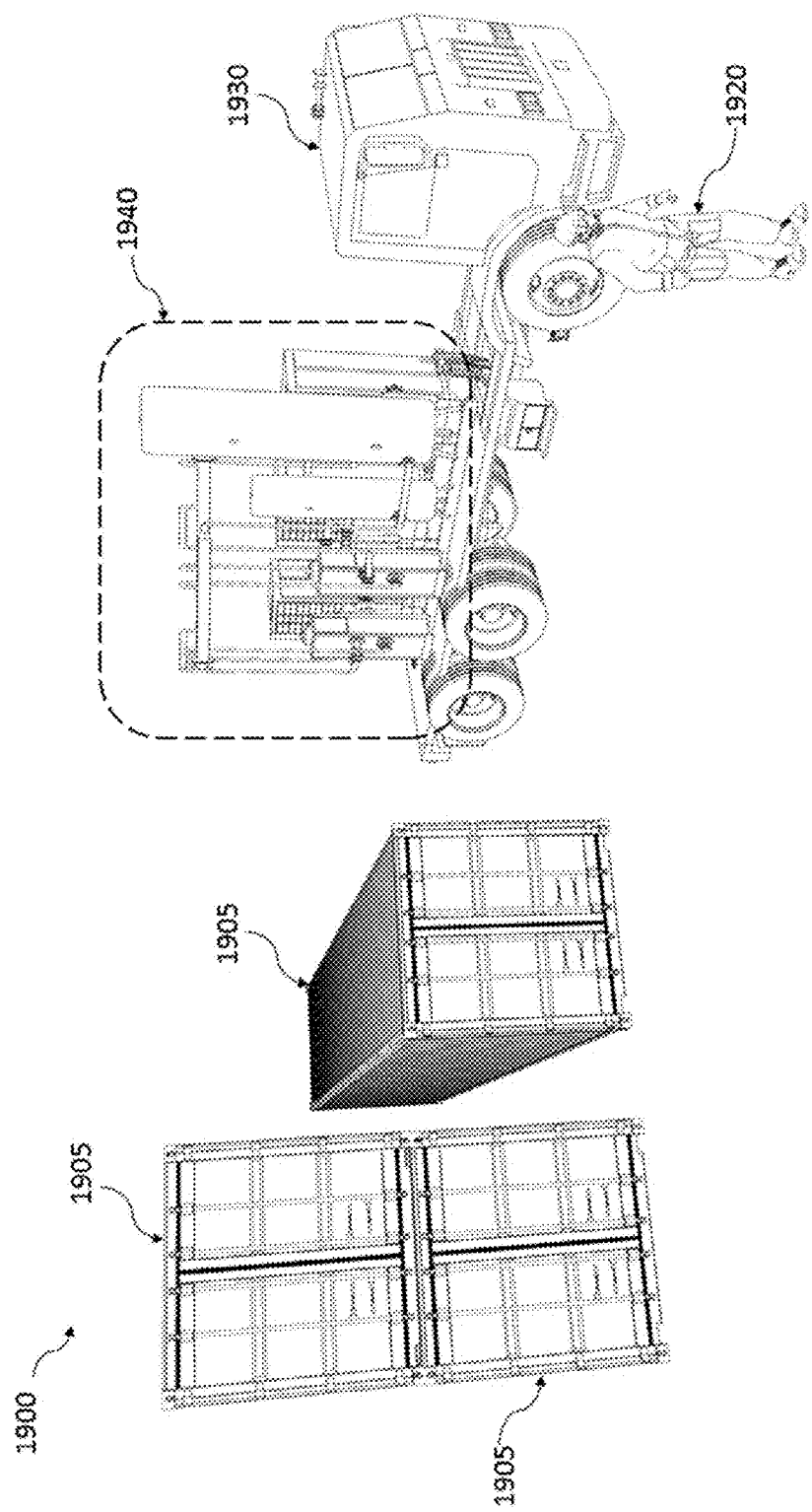
FIG. 19 is a schematic of a mobile automated combined fumigation and capture system applicable to shipping containers according to an illustrative embodiment.

As would be appreciated, large scale commercial fumigation is a necessary process that that is performed on nearly all cargo vessels of all transportation types, air land and sea. Referring now to FIG. 19, there is shown a schematic of a mobile automated combined fumigation and capture system 1900 applicable to shipping containers 1905 according to an illustrative embodiment based on the system architecture illustrated in FIG. 18.

In this example, a standard form factor containerized enclosure suitable for global shipping such as the shipping containers 1905 shown in FIG. 19 forms the relevant containment volume. In this illustrative embodiment, system 1900 is truck mounted and hence mobile in order to service a number of containers 1905.

In this embodiment, mobile fumigation plant 1940 is deployed on a trailer that may be coupled to a prime mover 1930. A smaller number of operators 1920 are required to perform the fumigation process by virtue of the automation disclosed. Similar to the embodiment described in relation to FIG. 18 above, fumigation plant 1940 comprises, for example, a process controller, an absorption capture module, a separation module, a compressor, a temperature conversion module, gas and liquid filters, source fumigation gases, gas compressors and an electrical generator. The electronics for sensing and controlling the various elements of the fumigation plant are also included along with remote sensors and valves.

Figure 20:
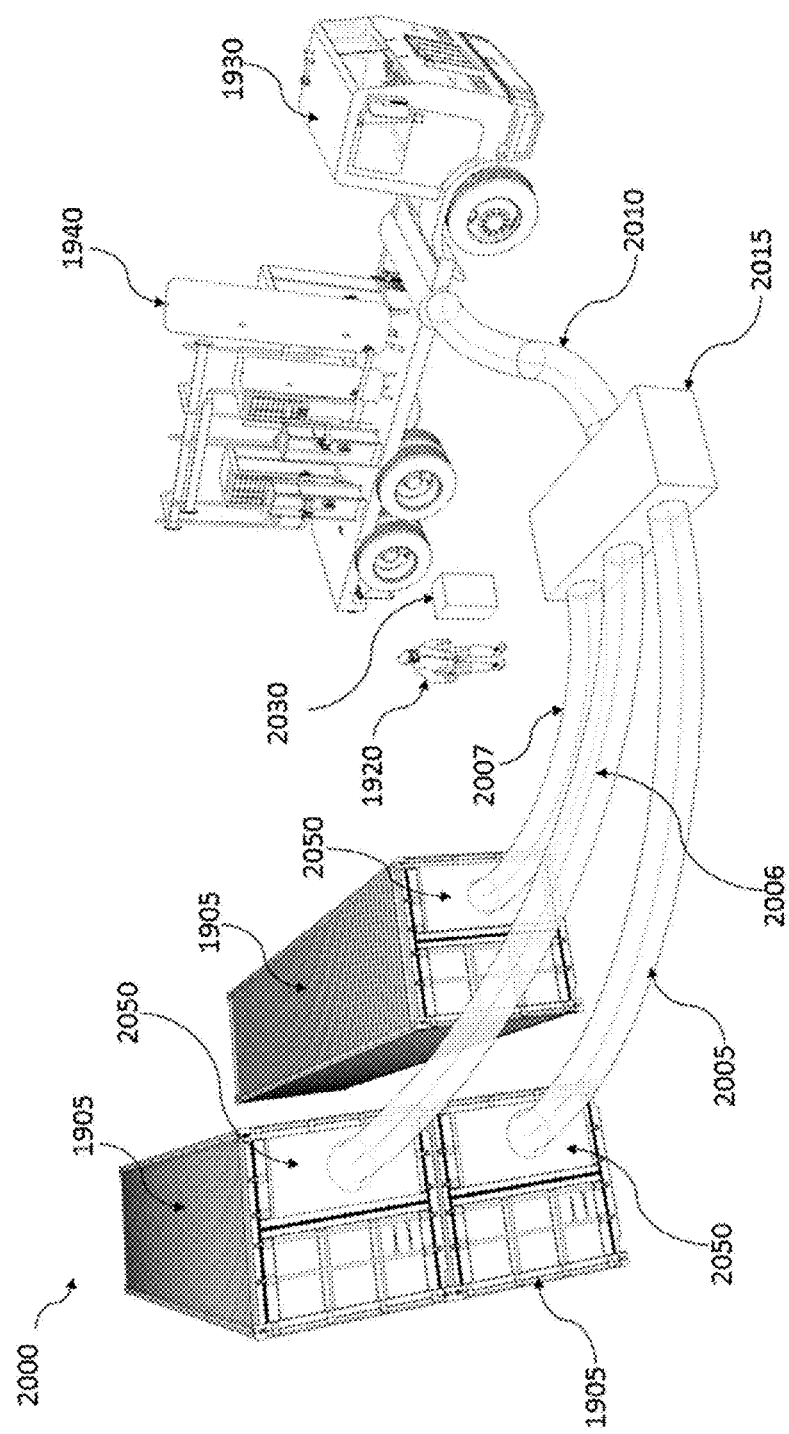
FIG. 20 is a schematic of the mobile automated combined fumigation and capture system illustrated in FIG. 19 deployed to fumigate multiple shipping containers according to an illustrative embodiment.

Referring now to FIG. 20, there is shown a schematic of mobile automated combined fumigation and capture system 1900 as illustrated in FIG. 19 deployed to fumigate multiple shipping containers 1905. A plurality of cargo containers 1905 may be fumigated simultaneously or in sequence through the use of a multiplexer and splitter 2015 for the gas transportation to and from the containers 1905. A container interface assembly 2010 is used to couple pipe conduits 2005, 2006, and 2007 to the splitter 2015. The splitter is then coupled to the fumigation plant 1940 via conduit 2010. A remote controller for controlling the fumigation plant and process 2030 is operated by an operator 1920.

Figure 21:
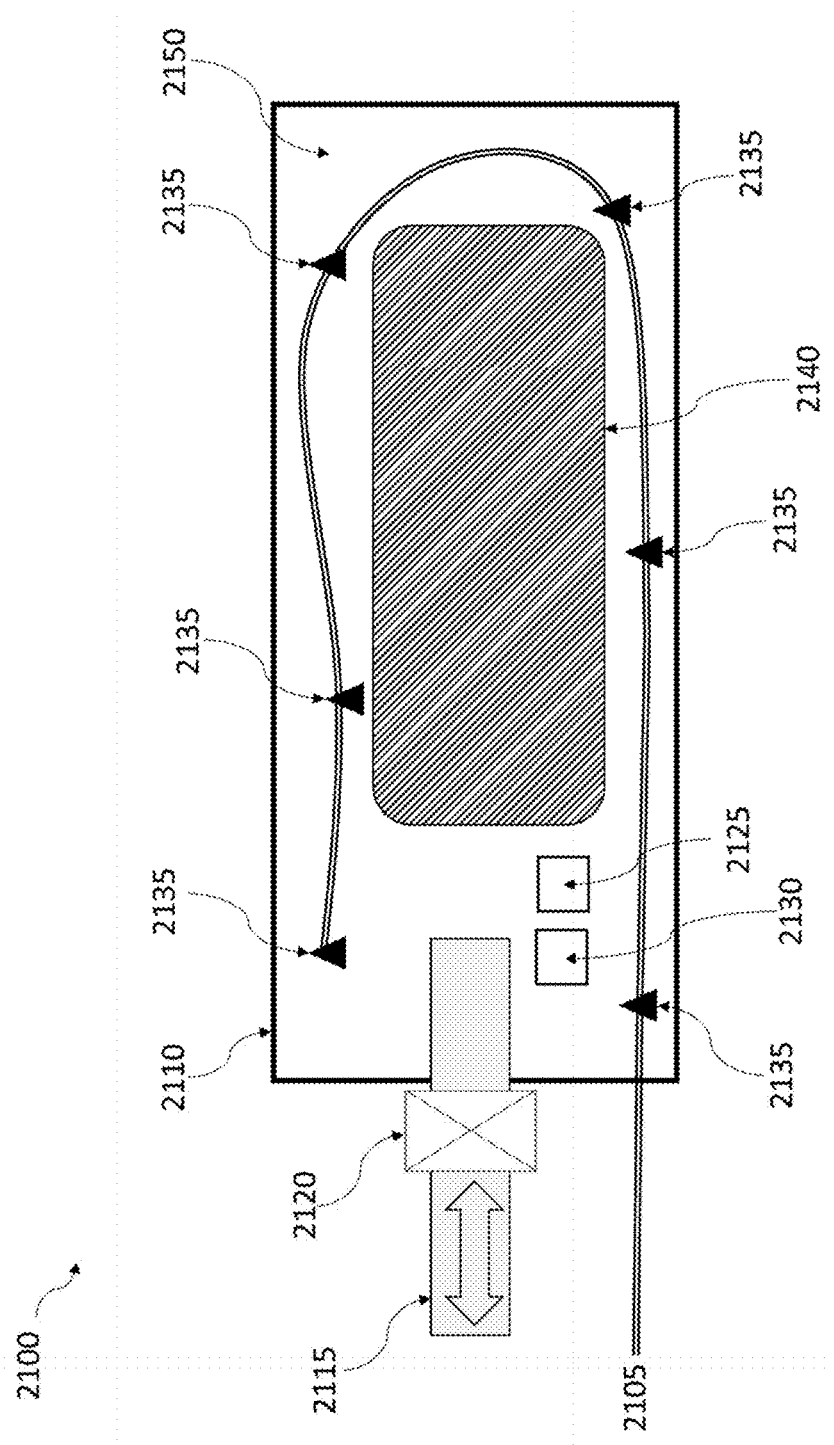
FIG. 21 is a schematic depicting an example deployment of a fumigation agent at multiple locations within a shipping container.

Referring now to FIG. 21, there is shown a schematic depicting an example deployment 2100 of a fumigation agent at multiple locations within a shipping container 2110. Fumigant process line 2105 is input into the container 2110 which forms the container volume 2150. The vent tube 2115 is connected to the fumigation plant 1940 as described and illustrated in FIG. 20. An isolation valve assembly 2120 is included to isolate the fumigation chamber from the environment. The source fumigant is distributed within the containment volume 2120 by using a plurality of nozzle injectors 2135. The product to be fumigated 2140 is positioned wholly within the container 2110, which is also used to transport the product. Internal sensors 2130 and 2125 provide control loop information relating to the chamber pressure and fumigant species concentration and or mixture. For example, fumigants such as $SF_2O_2$ can be uniquely monitored for concentration and number density using the far infrared signature observed via optical spectroscopy.

Figure 22:
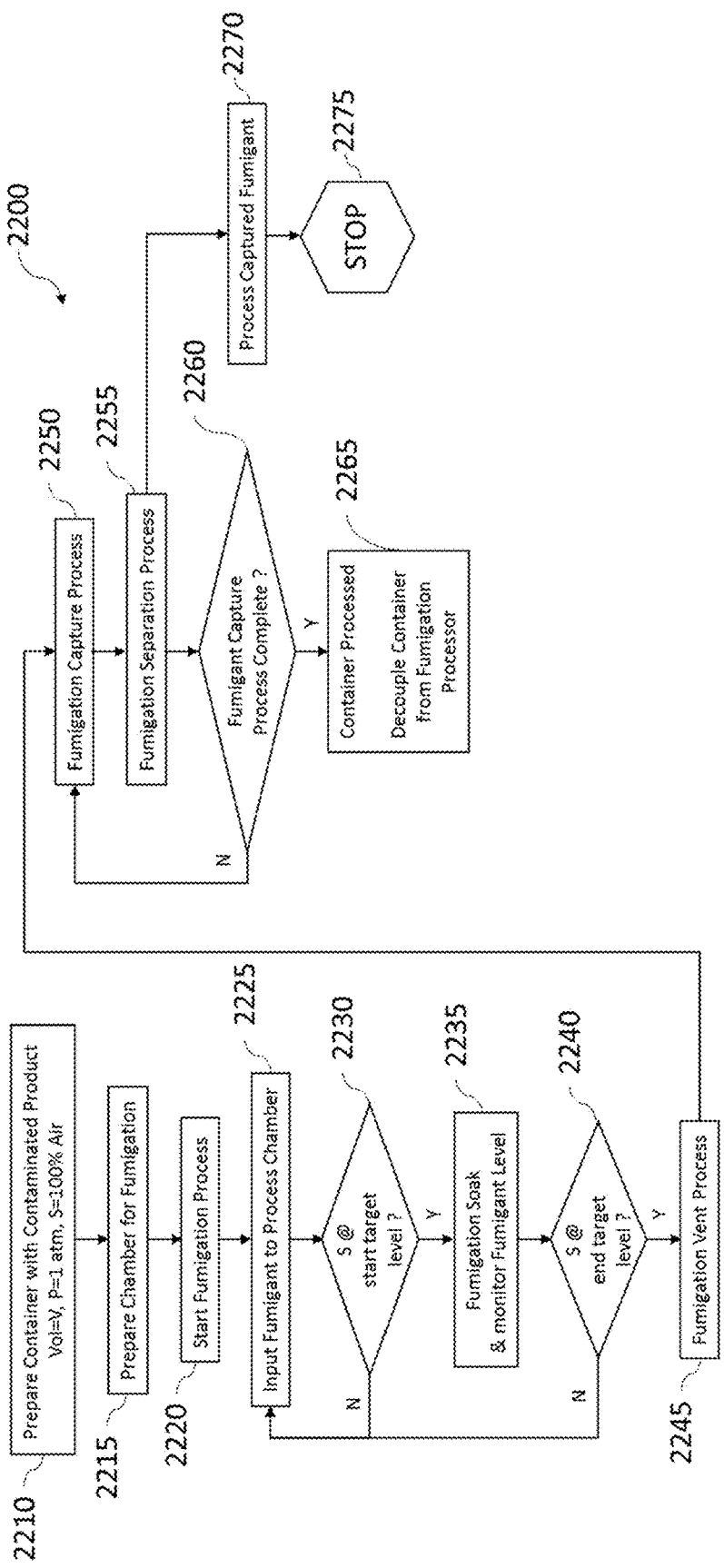
FIG. 22 is a flowchart of a method for fumigating a material or substance according to an illustrative embodiment.

Referring now FIG. 22, there is shown a flowchart of a method 2200 for fumigating a material or substance according to an illustrative embodiment. At step 2210, the containment volume is initially prepared with the material to be fumigated and in this embodiment the ambient gas in the containment volume is air at a pressure of 1 atmosphere. In this illustrative embodiment, containment volume is a chamber such as a shipping container or the like. At step 2215, the chamber is prepared by substantially sealing the containment volume. At step 2220 the fumigation process is commenced. At step 2215, the fumigation agent is introduced into the chamber. At step 2230, the partial pressure of the fumigation agent is measured to determine whether it has achieved the required elevated partial pressure as compared to the ambient air mixture in the containment volume. If this is not the case, then any of the techniques referred to above such as the pump purge or initial evacuation of the containment volume may be employed to assist in elevating the partial pressure to the required target level.

At step 2235, the fumigation soak occurs where the material in the containment volume is fumigated. At the end of the process at step 2240, the partial pressure of the fumigation agent is measured again as an elevated partial pressure not only assists the fumigation process but will further assist the fumigant abatement process whether that involves capture of the fumigation agent, decomposition of the fumigation agent or chemical conversion of the fumigation agent.

At step 2245, the containment volume is vented producing an output fumigation gas mixture including the residual fumigant. In this example, at step 2250, the output fumigation gas mixture is captured by sorbent material by either an absorption or adsorption process, as the case may be, thereby removing the residual fumigation agent from the output fumigation gas mixture to reduce its environmental impact. At step 2255, the sorbent material is processed to then separate the captured fumigant for further processing at 2270 where it may be recycled, decomposed or chemically converted as required. At step 2260, once the container volume has been vented and the residual fumigation agent captured, the container is then processed at step 2265 and may be decoupled from the fumigation system.

As would be appreciated, the steps of fumigation method 2200, and indeed any of the fumigation or abatement processes described above, may be implemented by the use of a dedicated automated controller or by a PC or similar processor running suitable software and operable to receive sensor inputs and to control the operation of the various pumping processes required to introduce fumigation agent into the containment volume, vent the output fumigation output mixture from the containment volume and control the operation of the various abatement modules as described above.

While some of the above embodiments have been based around halide-based fumigants such as SF, it is also understood that that the above described methods, processes and systems may be adopted for use with other fumigants, pesticides and nematocides. As would be appreciated, a number of chambers can be simultaneously processed with a single fumigant processing plant or staggered time sequential processing of multiple chambers or containers can be also achieved.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the invention as set forth and defined by the following claims.

What is claimed is:

1. A method for fumigating a material including:
containing the material to be fumigated in a containment volume, the containment volume also containing an ambient air mixture;
forming a gas mixture in the containment volume, the gas mixture comprising at least a fumigation agent and the ambient air mixture originally present within the containment volume, wherein forming the gas mixture in the containment volume includes:
initially evacuating a portion of the ambient air mixture from the containment volume to reduce a pressure of the ambient air mixture in the containment volume below atmospheric pressure; and
introducing the fumigation agent into the containment volume to raise a pressure of the gas mixture in the containment volume above atmospheric pressure;
allowing the pressure of the gas mixture in the containment volume to equalize to atmospheric pressure;
maintaining the pressure of the gas mixture at atmospheric pressure within the containment volume for a required time to fumigate the material; and
removing the fumigation agent from the containment volume.

2. The method of claim 1, wherein the fumigation agent includes a fumigant gas and a buffer gas.

3. The method of claim 2, wherein introducing the fumigation agent into the containment volume to raise the pressure of the gas mixture in the containment volume above atmospheric pressure includes:
initially introducing the fumigant gas into the containment volume; and
introducing the buffer gas into the containment volume.

4. The method of claim 2, wherein introducing the fumigation agent into the containment volume to raise the pressure of the gas mixture in the containment volume above atmospheric pressure includes:
initially introducing the buffer gas into the containment volume; and
introducing the fumigant gas into the containment volume.

5. The method of claim 4, wherein the step of initially introducing the buffer gas into the containment volume includes:
introducing sufficient buffer gas into the containment volume to raise a pressure of a combination of the ambient air mixture and buffer gas above atmospheric pressure; and allowing the pressure of the combination of the ambient air mixture and buffer gas in the containment volume to equalize to atmospheric pressure prior to the introduction of the fumigant gas into the containment volume to then raise the pressure of the gas mixture in the containment volume above atmospheric pressure.

6. The method of claim 4, wherein the step of initially introducing the buffer gas into the containment volume includes:

evacuating a portion of a combination of the ambient air mixture and buffer gas in the containment volume following the introduction of the buffer gas into the containment volume to lower a pressure of the combination of the ambient air mixture and buffer gas in the containment volume below atmospheric pressure.

7. The method of claim 2, wherein the buffer gas is selected to increase the metabolic rate of a pest being fumigated.

8. The method of claim 1, wherein forming a gas mixture in the containment volume further includes:

following allowing the pressure of the gas mixture in the containment volume to equalize to atmospheric pressure then:

introducing further fumigation agent into the containment volume to raise the pressure of the gas mixture above atmospheric pressure; and allowing the pressure of the gas mixture in the containment volume to again equalize to atmospheric pressure.

9. The method of claim 1, wherein forming a gas mixture in the containment volume further includes:

prior to allowing the pressure of the gas mixture in the containment volume to equalize to atmospheric pressure;

reducing the pressure of the gas mixture in the containment volume below atmospheric pressure; and introducing further fumigation agent into the containment volume to raise the pressure of the gas mixture in the containment volume above atmospheric pressure.

10. The method of claim 8, wherein the fumigation agent includes a fumigant gas and a buffer gas.

11. The method of 10, wherein the buffer gas is selected to increase the metabolic rate of a pest being fumigated.

* * * * *